United States Patent [19]
Cuniberti

[11] 3,896,926
[45] July 29, 1975

[54] MOTION TRANSLATING APPARATUS AND CONTROLS THEREFOR

[75] Inventor: Mario Cuniberti, Columbus, Ohio

[73] Assignee: Owens-Illinois, Inc., Toledo, Ohio

[22] Filed: Nov. 23, 1973

[21] Appl. No.: 418,553

Related U.S. Application Data

[62] Division of Ser. No. 295,530, Oct. 6, 1972, Pat. No. 3,841,497.

[52] U.S. Cl. ............................... 198/241; 198/238
[51] Int. Cl. ............................................. B65g 47/24
[58] Field of Search ............ 198/20 R, 25, 209–211, 198/236, 237, 238–243; 214/1 B, 1 BB, 1 BS, 1 BT, 1 Q, 89

[56] References Cited
UNITED STATES PATENTS

| | | | |
|---|---|---|---|
| 2,833,434 | 5/1958 | Stover et al. | 198/237 |
| 3,252,588 | 5/1966 | Altenburger | 198/25 |
| 3,272,360 | 9/1966 | Van Der Schoot | 198/20 R |
| 3,302,768 | 2/1967 | Cooper | 198/239 |
| 3,770,098 | 11/1973 | Baugnies et al. | 198/25 |

Primary Examiner—Evon C. Blunk
Assistant Examiner—Joseph E. Valenza

[57] ABSTRACT

The principles of operation of the various mechanisms are illustrated in a preferred form of an apparatus for transferring an article from an article pickup station to an article deposit station. A carrier housing is moved up and down along a vertical travel path and carries an indexing hub journally supported therein for rotation in the carrier housing. Article pickup means are provided and include one or more arms extending from the hub means and an article grasping device on each of the arms. A first one of the arms extends towards and positions the article grasping device carried thereon at a pickup station to enable article grasping when the carrier housing is at one end of the vertical travel path. The position of the article on the pickup means may be reoriented during the travel of the pickup means from the pickup station to the deposit station. The article is inverted by the indexing of the pickup arm and is stripped from the pickup arm during travel of the carrier housing downwardly.

9 Claims, 37 Drawing Figures

PATENTED JUL 29 1975 3,896,926

SHEET 1

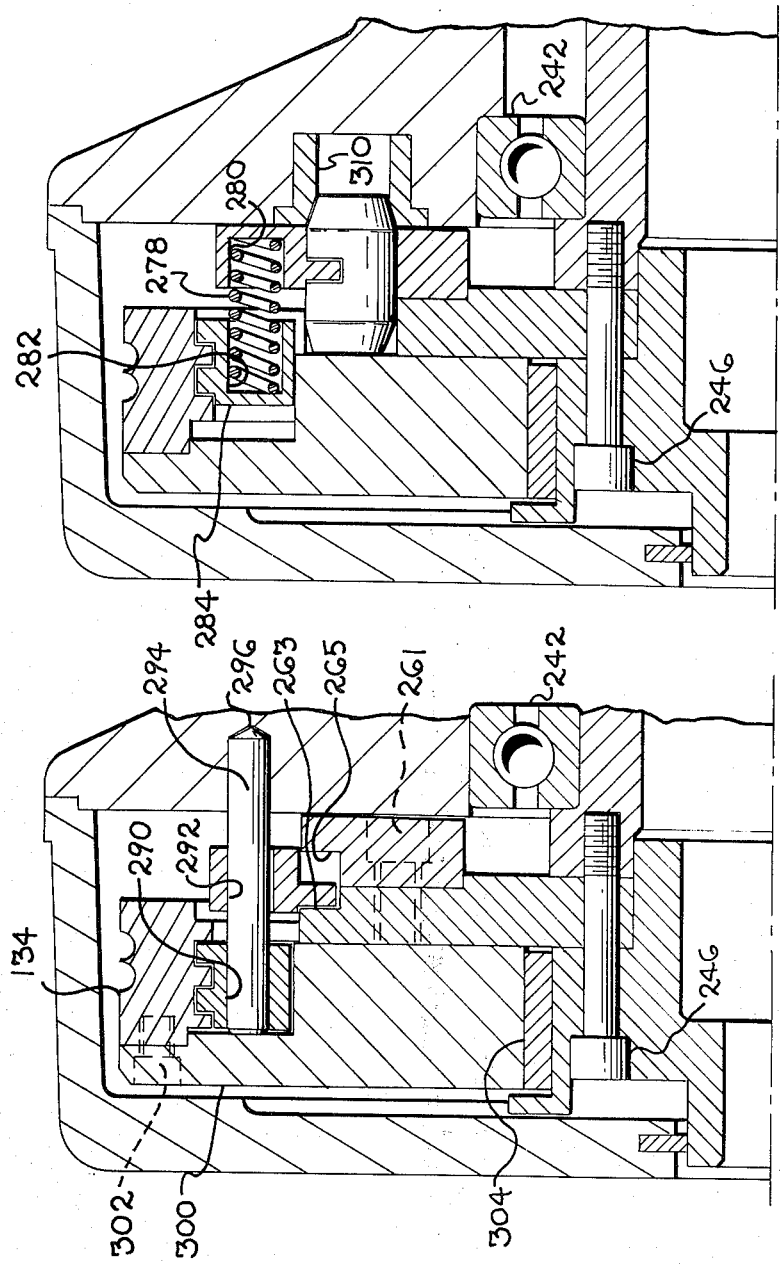

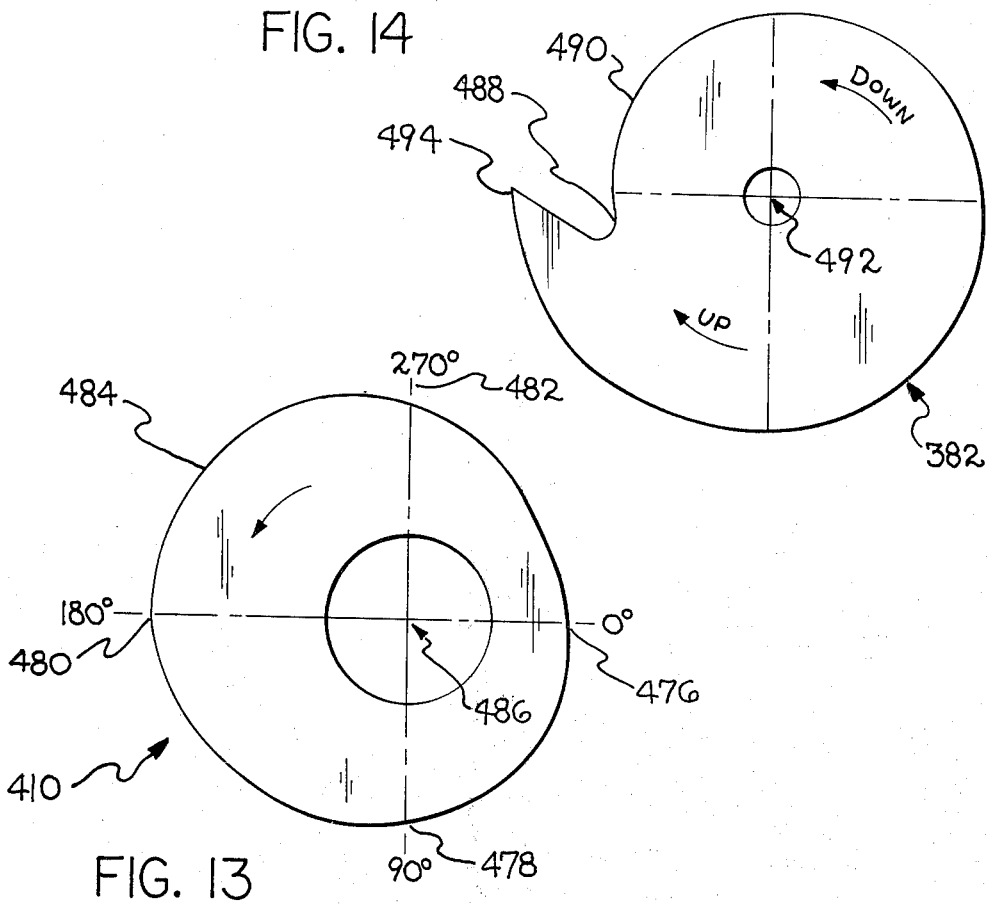
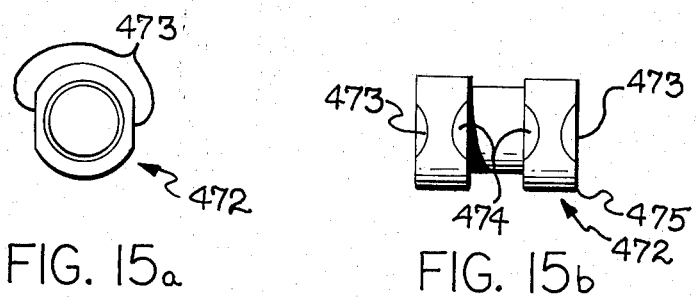

MOTION TRANSLATING APPARATUS AND CONTROLS THEREFOR

BACKGROUND OF THE INVENTION

This application is a division of my copending application Ser. No. 295,530, filed Oct. 6, 1972 now U.S. Pat. No. 3,841,497.

Although not limited thereto the present invention is described in an application for the manufacturing of molded glass components and particularly to means for transferring glass funnels for television picture tubes from an indexing table of a centrifugal casting machine to a funnel removal conveyor which carries the funnel components to later process stations.

Prior known related devices have been limited to use with flat rim objects or do not invert to a conveyor with a single chucking. The operation of the various subsystems to provide the desired movements provides advantages in simplicity and reliability over the presently known ways for hydraulically, pneumatically or electrically initiating and coordinating the desired motions.

Accordingly, it is an object of this invention to provide an improved motion translating system and controls therefor.

It is a further object of this invention to provide improved apparatus for transferring an article from an article pickup station to an article deposit station.

A still further object of this invention is to provide improved apparatus for unloading and inverting workpieces from a pickup station, such as an open cavity glass mold on an indexing mold table, to a workpiece removal station such as a conveyor, in one continuous motion.

A yet further object of this invention is to provide an improved apparatus providing a basic movement of one or more arms on a hub so that after the hub has risen a short distance vertically the hub is gradually rotated to rotate the pickup arms while continuing its upward travel. The downward stroke of the indexing hub to return the apparatus to a pickup position is accomplished without arm rotation.

A still further object of this invention is to provide an improved automatic mechanical clutch, which may be utilized herein to lock the arms in and out of rotation modes during upward and downward travel of the indexing hub.

Another object of this invention is to provide an improved apparatus for reorienting workpieces on pickup heads between the time the article is picked up at a pickup station and deposited at a deposit station. In the overall system disclosed herein this apparatus specifically rotates a pickup head carried by an arm to orient a workpiece from its first position as picked up, to a second position to align the workpiece for removal of further operations thereon.

Another object of this invention is to provide an improved vacuum operated pickup head and a mechanical vacuum valve for controlling connection of a vacuum source to the pickup head. In the use of this subsystem in the overall system herein, the mechanical vacuum valve provides connection to a vacuum source for the pickup head at the pickup position. When the pickup head with an article thereon has been inverted, to enable the article to remain on the pickup head by gravitational forces, the vacuum source is disconnected and the pickup head vented to the atmosphere to release its grasp on the article.

An additional object of this invention is to provide an improved apparatus for positively relating the selective rotation of a hub to the linear travel of a carrier housing journally supporting the hub. More specifically it is an object to provide an improved mechanical cable, chain and cable drum system for positive rotation of a pickup arm.

It is a further additional object of this invention to provide an improved control system for synchronizing the continuous cycling of a first machine with the cycle of a second machine, and to further provide a choice of motion programs for the first machine while retaining synchronization with the second machine. The improved control system includes means for interlocking operations to prevent the starting of automatic operation of the first machine when it is out of phase with the cycle of the second machine. Moreover, the control system includes means for inhibiting operation of the second machine when components of the first machine are located in a position which would interfere with the operation of the second machine.

A still further object of this invention is to provide an improved apparatus including an indexing hub and means responsive to the indexing operations of the hub for controlling article pickup means carried on pickup arms extending from the indexing hub.

SUMMARY OF THE INVENTION

In carrying out the above objects the invention features in a preferred embodiment a system for controlling relative motion for a plurality of components. An element is provided which is to be selectively rotated. The carrier housing journally supports the element. Means are provided for moving the carrier housing to cause the element to be rotated to travel along a predetermined path, the path having a first portion along which the element is not to be rotated and a second portion along which the element is to be rotated. Means are provided for rotating the element. Means responsive to the position of the element on the path provides a signal when the element is on one of the two portions noted above. Means responsive to the sensing means connects the element rotating means to rotate the element when the element is traveling along a second portion of the path.

The element rotating means may include wheel means. The element position sensing means may sense the position of the element on the path by sensing the position of the carrier means or housing. The element to be selectively rotated may comprise a rotatable drum means, while the element rotating means may further include flexible means for connecting the rotatable drum means to the wheel means.

The flexible connecting means between the wheel means and the rotatable drum means may be maintained at a length which will not cause rotation of the rotatable drum means when the drum means is moving along the first portion of the path. The length of the flexible connecting means between the wheel means and the rotatable drum means may be changed when the drum means is moving along the second portion of the path to impart rotation to the drum means.

More specifically, in the embodiment shown herein, there is provided a means for paying out the flexible connecting means to the drum means and for taking up the flexible connecting means from the drum means by the wheel means at a rate which permits travel of the drum means along the first portion of the path without rotation being imparted to the drum means. For the second portion of the path there is provided means for paying out and taking up the flexible connecting means from the drum means by the wheel means at a rate which imparts rotation to the drum means when the drum means is traveling along the second portion of the path.

The wheel means may include at least two spaced wheel devices, each having peripheral surfaces for engaging the flexible connecting means. The rate of payout and takeup may be changed by means for varying the effective radius of the peripheral surfaces of the wheel devices. The wheel devices are advantageously fixed relative to the path of travel of the drum means.

The carrier housing moving means may be connected to reciprocate the drum means along a linear path. The wheel devices may be stationed adjacent the ends of the path and be driven by the carrier moving means. Each of the wheel devices may have a spiral shaped means for engaging the flexible connecting means formed on the peripheral surface thereof. The portion of the spiral shaped means of each of the wheel devices may have an effective radius which changes from a first smaller value to a second larger value or vice versa.

In the embodiment disclosed herein the rotatable drum means has a helical cable receiving groove formed on the periphery thereof. The wheel devices may be cable sheaves rotatably supported at each end of the linear path. A cable may be trained around a groove of the rotatable drum and connected at each end to the cable sheaves. Each of the sheaves may have a spiral cable receiving groove formed in the peripheral surface thereof, a portion of each spiral groove having an effective radius which changes from a first smaller value to a second larger value. The carrier moving means may be connected to also rotate the cable sheaves, thereby providing a direct translation signal of the position of the rotatable drum means on the path to the cable sheaves.

Each of the cable sheaves preferably has a portion of the cable receiving groove formed thereon with an effective radius of one of the first and second effective radius values noted hereinbefore, which permits the cable to be paid out to and taken up from the rotatable drum means at a rate which matches the travel of the rotatable drum along the linear path, thereby preventing rotation of the rotatable drum means. The means responsive to the position of the carrier means may comprise that portion of the cable receiving groove of each of the sheaves which changes the effective radius thereof, the position sensing portion being located adjacent to that portion of the groove which provides a payout and takeup rate identical to the rate of linear travel of the rotating drum.

An indexing hub means may be journally supported in the carrier means. A clutch means is advantageously provided for selectively connecting the index hub means to the selectively rotatable cable drum means. Thus, the clutch means may selectively connect the indexing hub to the rotatable drum to be in turn selectively rotated when the element is traveling in the first direction along a path. In the specific embodiment shown the carrier moving means reciprocates the carrier along a vertical linear path. The first portion of the vertical path is the first upward vertical movement of the carrier means. The clutch means is actuated to connect the rotatable drum element to the indexing hub when the rotatable element is traveling in an upward direction. As disclosed, the indexing hub is rotated 180° during the second portion of the vertical travel of the rotatable cable drum. The indexing hub means is then maintained in its indexed position without rotation during downward vertical travel of the rotatable element.

In the embodiment described a pair of arms are mounted on the indexing hub and extend in opposite directions from each other and have article grasping means mounted on the ends thereof. Means are provided for actuating one of the article grasping means to grasp an article when the rotatable drum means is at the lower end of the vertical travel. The article grasping means are actuated to release a grasped article when the rotatable cable drum is at the upper end of the article travel, the combined movement enabling an article to be grasped, lifted, inverted, and released from the grasp of the article pickup means. The apparatus advantageously further includes means for rotating the article grasping means between an article grasping and an article release location to reorient the position of the article with respect to the arm which extends from the indexing hub means.

Means such as a centrifugal casting machine successively supplies articles to the pickup station to be grasped by the article grasping means. Means are provided for synchronizing the article supplying means and the movement of the carrier means to enable the disposition of the article grasping means at an article pickup station when an article has been supplied at the pickup station by the article supplying means. The control means further includes means for sensing an article supplying movement of the article supplying means to the pickup station, and means responsive to the article supplying movement sensing means for enabling movement of the article grasping means to grasp an article at the pickup station only when the article supplying means is in a position to avoid contact between the article supplying and the article grasping means.

A synchronizing means is provided which includes means for enabling a cyclic movement of the carrier housing in response to a corresponding cyclic movement of the article supplying means. The synchronizing means may include means for programming a cyclic movement of the carrier housing in response to a corresponding cyclic movement of the article supporting means, means for sensing the actual position of the carrier housing, and means for comparing the sensed actual position of the carrier housing and the programmed cyclic movement for the carrier housing to interrupt movement of the carrier housing if the actual position of and the programmed movement for the carrier housing are out of phase by a predetermined amount.

The control system may further include means for sensing the position of the article grasping means with respect to the article supplying means. The article supplying means is inhibited from executing an article supplying movement in response to the sensing of the position of the article grasping means which would interfere with an article supplying movement by the article supplying means.

Other objects, advantages, and features of this invention will become apparent when the following description is taken in conjunction with the accompanying drawings, in which:

FIg. 8 is a partial view, shown in cross section, of the apparatus illustrated in FIGS. 6a, 6b, and 7 showing the interrelation and disposition of certain of the components of the automatic mechanical clutch with respect to the rotatable cable drum and the indexing hub;

FIG. 9 is a partial view of the apparatus illustrated in FIGS. 6a, 6b, and 7 showing the operation of the clutch during disengagement of the indexing hub from the rotatable cable drum and the connecting of the indexing hub to the carrier housing to lock the indexing hub against rotation;

FIG. 13 is a side elevational view of a program cam utilized in the apparatus of this invention;

FIG. 14 is a side elevational view of a feedback cam utilized in the control system of this apparatus;

FIGS. 15a and 15b are end and side elevational views of a valve spool advantageously utilized in a servo valve in the control system for this apparatus;

DESCRIPTION OF THE PREFERRED EMBODIMENTS

Figure 1:
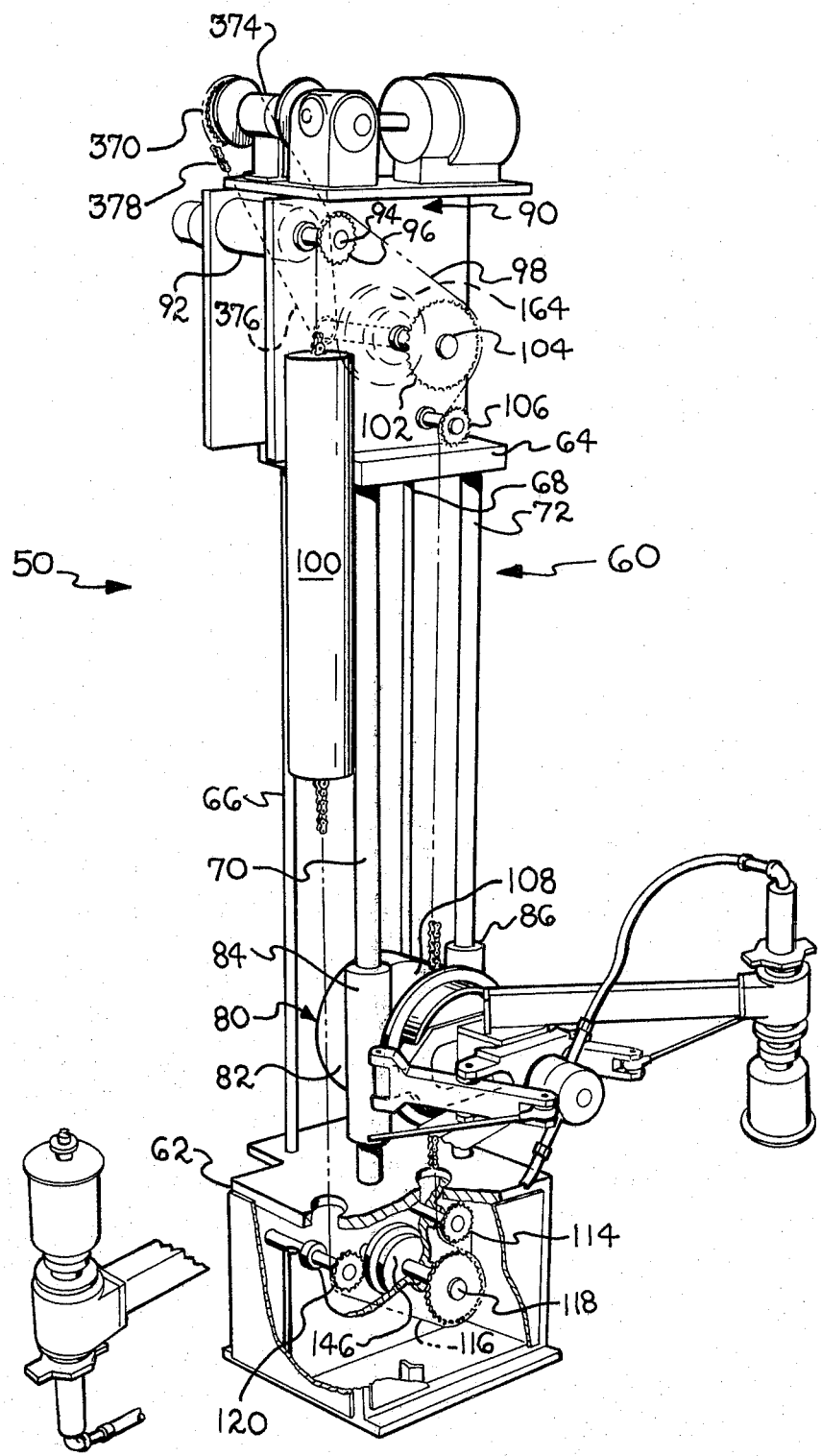
FIG. 1 is a view in perspective of a transfer device embodying the teachings of this invention taken from a left front point.

Referring now to the drawings, and in particular to FIGS. 1 through 4, there is indicated generally at 50 a transfer device for carrying out the objects and illustrating the features of this invention. For the purpose of clarity some of the machine's components have been broken away, and other components have been omitted from the drawing in FIG. 1 but will be shown in detail in later Figures.

The transfer device 50 includes a frame structure 60 having a lower base 62 and an upper housing and support structure 64 spaced from base 62 and supported on rear standards 66, 68 and front standards 70, 72. Other suitable frame supports (not shown) may be used. Standards 70, 72 also serve as guides for an indexing hub assembly 80 as will be described hereinafter.

The indexing hub assembly 80 includes a hub carrier housing 82 having vertical guide sleeves 84,86 attached to each side of housing 82 and slidably mounted on the fromt guide standards or rods 70, 72.

The housing 82 is lifted and lowered between workpiece pickup and workpiece deposit positions by a carrier drive means indicated generally at 90. The carrier drive means includes a reversible chain drive motor 92 which may be hydraulically, electrically, or otherwise suitably powered, but which in this embodiment will is a hydraulically powered motor.

The reversible chain drive motor 92 has a drive shaft 94. A drive sprocket 96 is secured on shaft 94 and engages a first drive chain section 98. One end of chain section 98 extends downwardly from sprocket 94 and is secured to the upper end of a counter weight 100. The other end of chain section 98 is trained over an upper hub carrier and upper sheave drive sprocket 102 which is secured on a shaft 104 journally mounted in bearings carried in the upper support housing structure 64. The chain section 98 is then trained around an upper hub carrier idler and alignment sprocket 106 and then secured at 108 to the upper side of the carrier housing 82.

A second drive chain section 110 is secured to the lower side of housing 82 at 112 and extends downwardly therefrom around a lower hub carrier idler and alignment sprocket 114. From the sprocket 114 the chain section 110 is trained around a lower hub carrier drive and lower sheave drive sprocket 116 which is secured to a shaft 118 journally mounted in bearings carried in the base structure 62. The chain section 110 then proceeds around a counter weight idler sprocket 120 and is secured to the lower end of counter weight 100 at 122.

Figure 2:
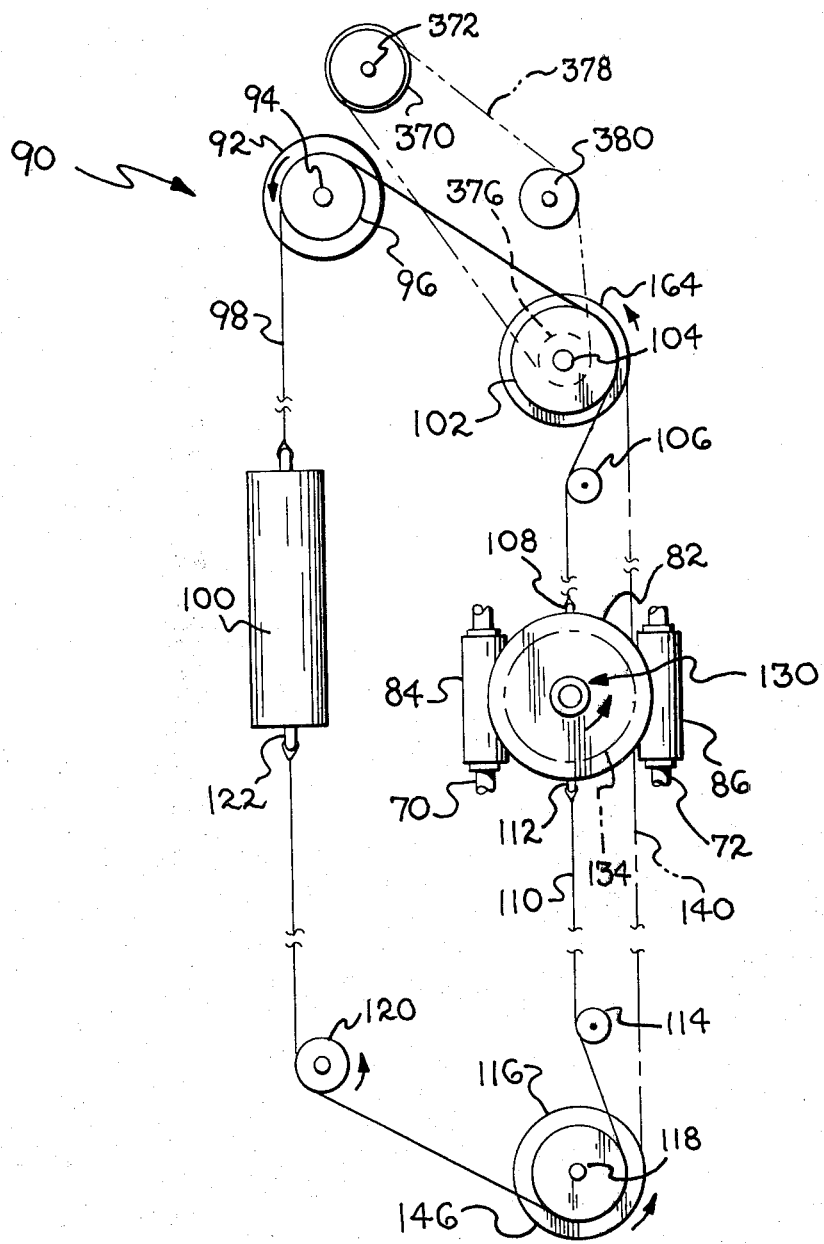
FIG. 2 is a schematic view, taken from the front, of the cable, chain and drum system for imparting positive rotation to the pickup arms.

Thus, when the hub carrier housing 82 is at a lower or workpiece pickup position adjacent the base 62, the motor 92 may be energized to cause counterclockwise rotation (as seen in FIG. 2) of drive sprocket 96 to lower the counter weight 100 and lift the hub carrier housing 82 vertically along the path defined by the sliding engagement of guide sleeves 84, 86 on guide rods 70, 72 toward an upper or workpiece deposit position adjacent the upper housing support structure 64.

When the hub carrier housing 82 reaches the desired upper deposit position, the arrival at that upper position is sensed by the arrival of a program cam at an "upper position" input and the sensing of compliance by the hub carrier housing 82 by a feedback cam. The chain drive motor 92 is then energized in the reverse direction by control means to be described hereinafter. The resulting clockwise rotation of the chain drive sprocket 96 lifts the counter weight 100 and lowers the hub carrier housing 82 vertically downwardly from the upper deposit position toward the lower or workpiece pickup position. The arrival of the hub carrier housing 82 at the lower workpiece pickup position is sensed for control purposes, the drive motor 92 is energized in the reverse direction by the control means therefor, and the next cycle of the vertically reciprocating travel of the hub carrier housing 82 along the vertical linear path just described is initiated.

An indexing hub element 130 extends from and is journally supported in the hub carrier housing 82. The indexing hub 130 is rotated 180° counterclockwise (as viewed in FIG. 2) during the upward travel of housing 82, but is not rotated during the downward travel of the housing 82. The 180° rotation of hub 130 is imparted thereto by a hub cable drum 134 (best seen in FIG. 3) which is selectively connected to hub 130 via a clutch mechanism in the indexing hub assembly 80, the clutch mechanism to be described hereinafter. The hub cable drum 134 is rotatably carried in the indexing hub assembly 80 and has a cable receiving helical groove 136 formed around the outer periphery thereof.

The drawings in FIGS. 2 through 5 are schematic in order to more clearly represent and clarify the operation of the transfer device. The dimensions of certain components in those drawings have been enlarged or reduced where necessary to clarify the operation of those components relative to the transfer operation of the transfer device 50.

Figure 3:
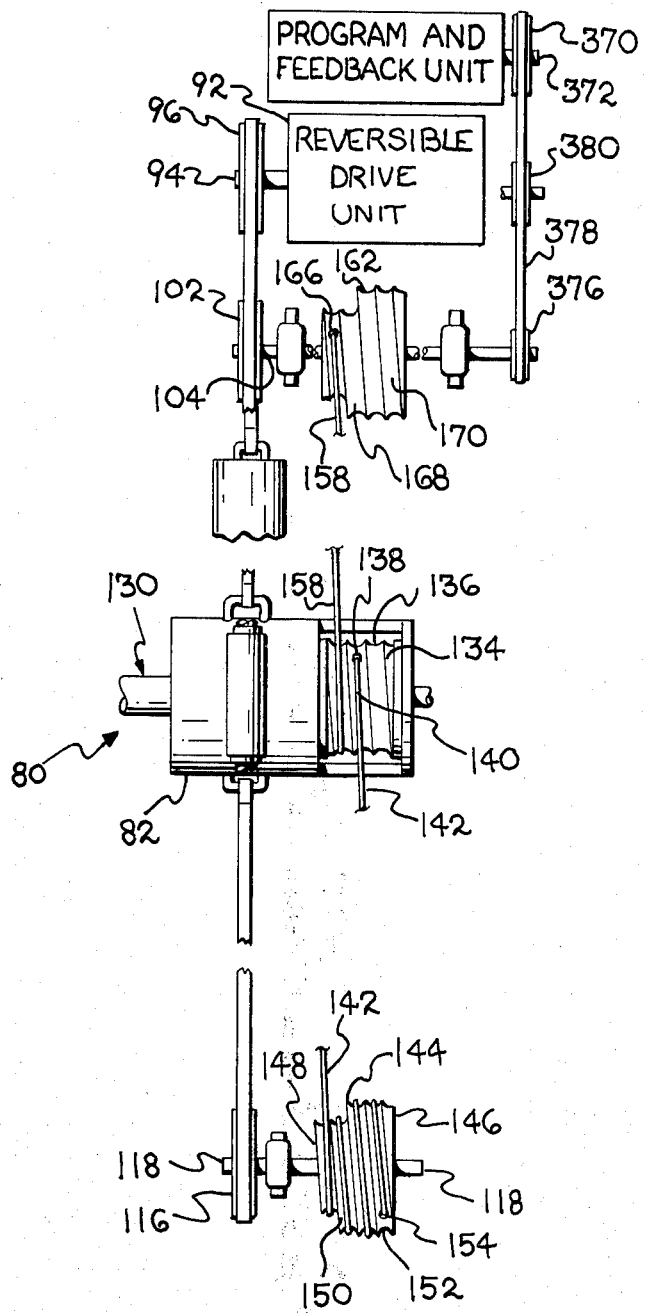
FIG. 3 is a schematic view of the system illustrated in FIG. 2 taken from the right side of FIG. 2.

The schematic view in FIG. 2 is taken from a front elevational viewpoint of FIG. 1. The schematic view of FIG. 3 is taken from the right side of FIG. 2. The schematic perspective view of the cable layout in FIG. 4 has been taken from a left front perspective with respect to FIG. 2. The schematic layouts of the operation of the transfer device illustrated in FIGS. 5a through 5f have been taken from the rear of FIG. 1.

As viewed in FIG. 3 the middle convolution of groove 136 has a bore 138 forming a chord between ends of an arc of the convolution. A cable 140 is received through the bore 138 and is secured therein by set screws or the like.

A first run 142 of the cable 140 extends downwardly toward and is trained around a generally helical cable receiving groove 144 formed in the periphery of the lower cable drive sheave 146 fixedly mounted in the shaft 118. The first or left hand convolution 148 of the groove 144 as seen in FIG. 3 has a pitch or effective radius equal to the effective radius of the sheave drive sprocket 116 also fixedly mounted on the shaft 118. An intermediate spiral shaped convolution 150 of the groove 144 has a pitch or effective radius that gradually increases from the first value of the effective radius of the first convolution 148 to a larger second pitch or effective radius of the right hand convolutions 152 of the groove 144. The end of the first run 142 of cable 140 is inserted into and secured in a bore 154 formed inwardly into the sheave 146 in the last or furtherest right convolution of the groove 144.

A second run 158 of the cable 140 is trained around the groove 136 of the hub cable drum 134 and extends from the left hand convolution thereof upwardly toward and is received in the left hand convolution 160 of a generally helical cable receiving groove 162 formed on the periphery of an upper cable drive sheave 164. The sheave 164 is fixedly mounted on the shaft 104. The end of the cable run 158 of the cable 140 is received in and secured in a bore 166 formed in the left hand convolution 160 of the sheave 164.

The left hand convolution 160 of the groove 162 has a pitch or effective radius which is equal to the effective radius of the drive sprocket 102 also fixedly mounted on the shaft 104. A spiral shaped intermediate convolution 168 of the groove 162 has a pitch or effective radius that gradually increases from the first value of the effective radius of the convolution 160 to a second larger pitch or effective radius of the right hand convolutions 170 of the groove 162. The total and the rate of increase in effective radius of each of the intermediate convolutions 150, 168 of the sheaves 146, 164, respectively, are equal. The effective radius of each of the convolutions 152, 170 of the cable receiving grooves 144, 162, respectively, are equal.

Figure 4:
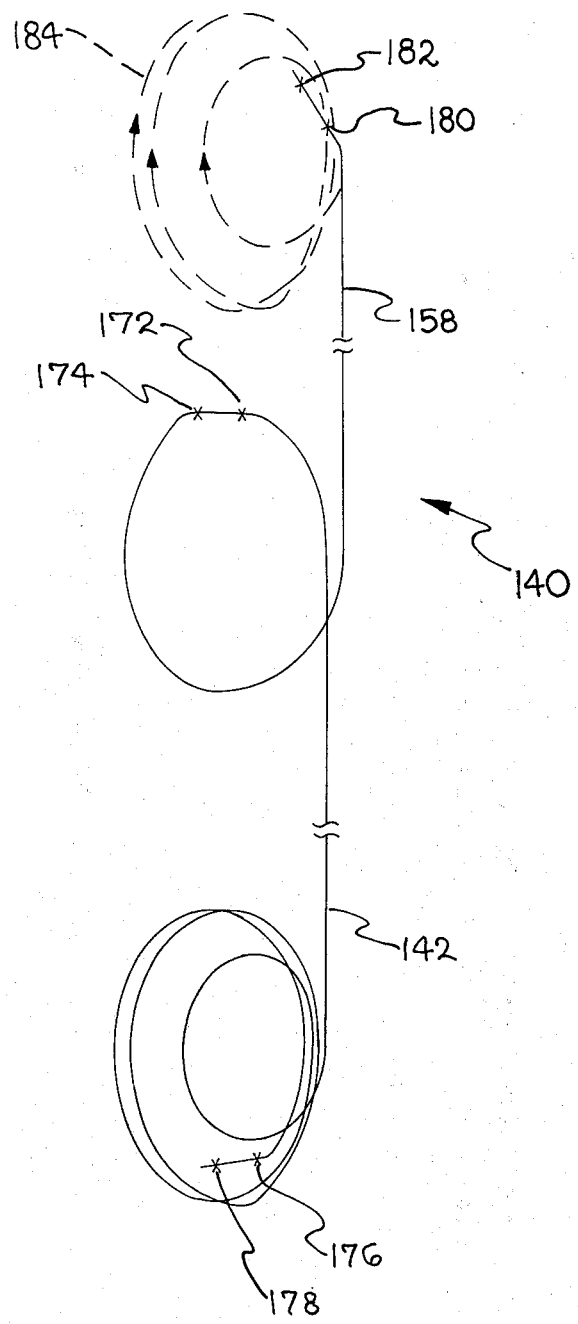
FIG. 4 is a perspective view of the cable layout of this invention taken from the left front of the device.

Referring to FIG. 4 there is illustrated schematically in perspective the cable 140, as it would appear lying in the cable receiving grooves of the hub cable drum 140, the lower cable sheave 146, and the upper cable sheave 164.

As noted hereinbefore, the cable 140 is secured to the hub drum 134 in the bore 138, for example, by set screws in the side of the drum 134 pressing the cable 140 against the side of the bore 138 at points 172, 174 in FIG. 4.

Similarly, the end of the first cable run 142 is secured in the bore 154 of the lower cable sheave 146, for example, by set screws pressing the cable against the side of the bore 138 at points 176, 178 in FIG. 4. The end of the second cable run 158 is secured in the bore 166, for example, by set screws pressing the cable against the side of the bore 166 at points 180, 182 in FIG. 4.

The perspective layout of the cable 140 in FIG. 4 illustrates the relative position and the magnitudes or values of the pitch or effective radius of each of the cable receiving grooves of the lower sheave 146 and the hub cable drum 134. The relative positions and the magnitudes or values of the pitch radius of the cable receiving groove of upper sheave 164 is indicated in FIG. 4 by the dotted line 184, with the arrow heads pointing in the direction that the cable run 148 will wrap around the sheave 164 as it is rotated in a counterclockwise direction as viewed in FIG. 2.

The cable 140 in FIG. 2 is shown in the position it will assume in the grooves of the sheaves 146, 164 with the largest effective radius when the indexing hub assembly 80 is at the uppermost position of its vertical travel. In FIG. 3, the cable 140 is shown in a position it will assume in the grooves having the smallest effective radius on the sheaves 146, 164, when the indexing hub assembly 80 is at its lowermost position of its vertical travel. The cable position of FIG. 3 has been selected as the basis for the illustration of the cable 140 as shown in perspective in FIG. 4.

The operation of the components just described is as follows. Assume that the assembly 80 is at its lowermost position, with the cable 140 disposed in the layout as shown in FIG. 4. The chain drive motor 92 is energized to rotate the chain drive sprocket 96 in a counterclockwise direction as viewed in FIG. 2, thereby lowering counter weight 100 and lifting the indexing hub assembly 80. The drive chain sections 98, 110 rotate the cable sheave drive sprockets 102, 116 in a counterclockwise direction. Thus, the cable sheaves 164, 146, respectively will also be rotated in a counterclockwise direction.

The relative movement of the indexing hub 130, in response to the reciprocating linear travel of the carrier housing 82 and the selective connection of the hub cable drum 134 to the hub 130 by the clutch mechanism, is illustrated schematically in FIGS. 5a through 5f by the corresponding movement of a pair of opposing pickup arms 200, 202 as viewed from the rear of the transfer device 50. The pickup arms 200, 202 are connected to and rotated by the indexing hub 130 of the indexing hub assembly 80, the connection of the arms to the hub being explained in more detail hereinafter.

Figure 5A:
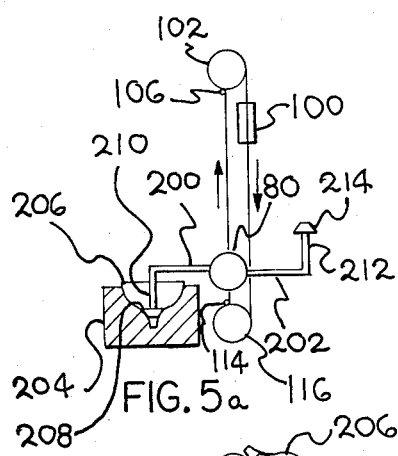
FIGS. 5a through 5f are schematic views illustrating the cycle of the transfer device from an article pickup position to an article deposit position and the return to an article pickup position.

In FIG. 5a the arms 200, 202 extend horizontally and are shown in the position they will assume when the hub assembly 80 is in its lowermost or article pickup position. The arm 200 extends over the cavity of a concave mold 204 to pick up a workpiece 206, in this instance the funnel component of a television picture tube. A vacuum chuck 208 is mounted on the end of a vertical post 210 depending downwardly from the arm 200. The arm 202 extends substantially horizontally on the opposite side of the indexing hub assembly 80 from the arm 200 and has a vertical post 212 extending upwardly from the arm 202 to support a vacuum chuck 214 on the end thereof.

As will be explained in detail hereinafter, a clutch mechanism in the indexing hub assembly 80 will selectively connect the indexing hub 130 to the hub cable drum 134 during the upward or first direction of travel of the indexing hub assembly 80 along the linear path, so that rotation of the hub cable drum 134 will impart a corresponding rotation to the indexing hub 130 during the upward travel. During downward travel of the assembly 80, the clutch disengages the hub cable drum 134 from the hub 130 and locks the hub in a stationary position so that the hub 130 will remain in the same position during the downward or second direction of travel, whether the drum 134 rotates or not.

During a first portion of the vertical travel upwardly of the indexing hub assembly 80, and thus during a first portion of the counter clockwise rotation, as viewed from the front in FIG. 2, of the sheave drive sprockets 102, 116 and the cable sheaves 164, 146, the effective radius of the grooves formed on the peripheries of the smaller ends of the sheaves 164, 146 is the same as the effective radius of the sheave drive sprockets 102, 116. Therefore, the length of the cable run 142 which is unrolled from the lower sheave 116 and the length of the cable run 158 which is wound onto the upper sheave 102 during the first portion of the vertical travel are equal to each other and to the distance of vertical linear travel upwardly of the indexing hub assembly 80. Thus, there is no cable wound onto or unwound from hub cable drum 134, and there is no rotation of the hub cable drum 134 during the first portion of the upward travel of the indexing hub assembly 80.

Figure 5B:
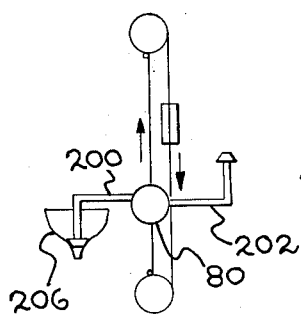

Since there is no rotation of the hub cable drum 134, the arms 200, 202 are maintained in their horizontal position during the first portion of the upward vertical travel of the indexing hub assembly 80. The workpiece 206 held by the vacuum chuck 208 is lifted vertically out of the mold 204 during the first portion of travel until the chuck 208 has cleared the mold sufficiently to enable initiation of rotation of the indexing hub 130 and the arms 200, 202 without any contact between the workpiece 206 and the mold 204. The end of this first portion of upward travel of the indexing hub assembly 80 is illustrated in FIG. 5b.

During a second portion of the upward vertical travel of the indexing hub assembly 80, after the workpiece has been lifted clear of the mold 204, the cable run 142 starts to unwind from the intermediate convolution 150 of the groove 144 of the lower sheave 146 and to be wound onto the intermediate convolution 168 of the groove 162 of the upper sheave 164. The effective radius of each of the intermediate convolutions 150, 162 increases at the same rate from the first smaller value of the effective radius of the smallest convolutions 148, 160 to the second larger value of the effective radius of the larger convolutions 152, 170.

As the effective radius of the intermediate convolutions 150, 168 gets larger than the effective radius of the sheave drive sprockets 116, 102, the length of the cable 140 being paid out from the lower sheave 146 and wrapped onto the upper sheave 164 is greater than the linear distance the indexing hub assembly 80, and thus the hub cable drum 134, travels vertically. Therefore, to provide more cable for the upper sheave 164 and to take up the excess cable being supplied from the lower sheave 146, there must be a rotation of the hub cable drum 134 in response to the forces applied at the points 172, 174 where the cable 140 is secured to the hub cable drum 134 (see FIG. 4). This initiates a clockwise rotation (as viewed in FIG. 5) of the drum 134 and, through the engaged clutch mechanism, a clockwise rotation of the hub 130 and the arms 200, 202 extending therefrom in FIG. 5c.

Figure 5C:
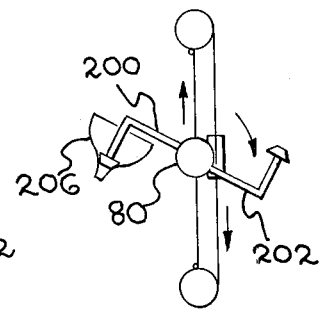
Figure 5D:
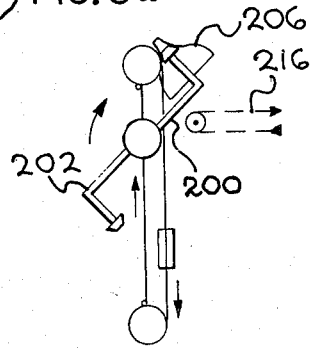

The rate of effective radius increase of the intermediate convolutions 150, 168 is sufficiently small so that the arms 200, 202 will be relatively gently started on the clockwise rotation illustrated in FIGS. 5c and 5d, thus preventing the sudden application of a large acceleration force at the vacuum chuck 208 which might overcome the workpiece retention capabilities of the chuck 208. The initial acceleration force will present no problem with the vacuum chuck of this invention, which will be described hereinafter, but might present a problem with other types of workpiece or article grasping and retention mechanisms or for other types of workpieces. No deceleration provision is made in the drum convolutions. The vertical and rotational motions decelerate together in response to the program provided by the input cam to be described hereinafter.

The amount of effective radius increase of the intermediate convolutions 150, 168 is such that, in combination with any unrolling and takeup of the cable 140 which may occur on the large convolutions 152, 170, the hub cable drum 134 is rotated at least 180° from its original position when at the lower pickup position in FIG. 5a. The clutch mechanism will disconnect the hub cable drum 134 from the hub 130 at the end of an indexing motion of the arms 200, 202. The indexing rotation selected for the embodiment of the transfer device 50 is 180°. Thus the hub 130 and the extending arms 200, 202 are rotated 180° from their original horizontal position in FIG. 5a through the positions shown in FIGS. 5c and 5d to the position shown in FIG. 5e.

Figure 5E:
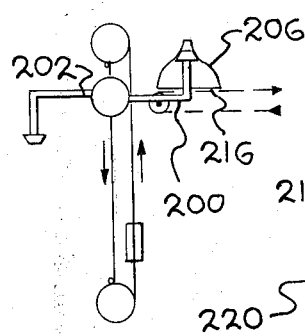

When the indexing hub 130 completes the 180° rotation, the clutch mechanism disengages the hub 130 from the drum 134 and locks the hub 130 and arms 200, 202 to the hub carrier housing 82 in the position shown in FIG. 5e.

The arrival of the indexing hub assembly 80 at its uppermost limit is sensed, or the completion of a 180° rotation of the arms is sensed, the two preferably occurring at the same time. In response to the sensing of the arrival of the indexing hub assembly 80 at its upper limit or the sensing of the arm rotation of 180°, the drive motor 92 is energized in the opposite direction to rotate the chain drive sprocket 96 in a clockwise direction, as viewed in FIG. 2, to lift the counter weight 100 and lower the indexing hub assembly 80.

Figure 5F:
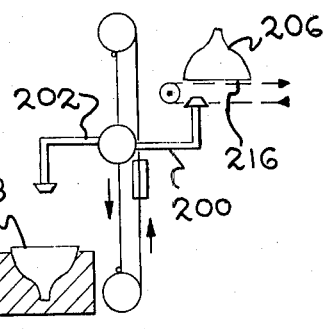
Figure 10:
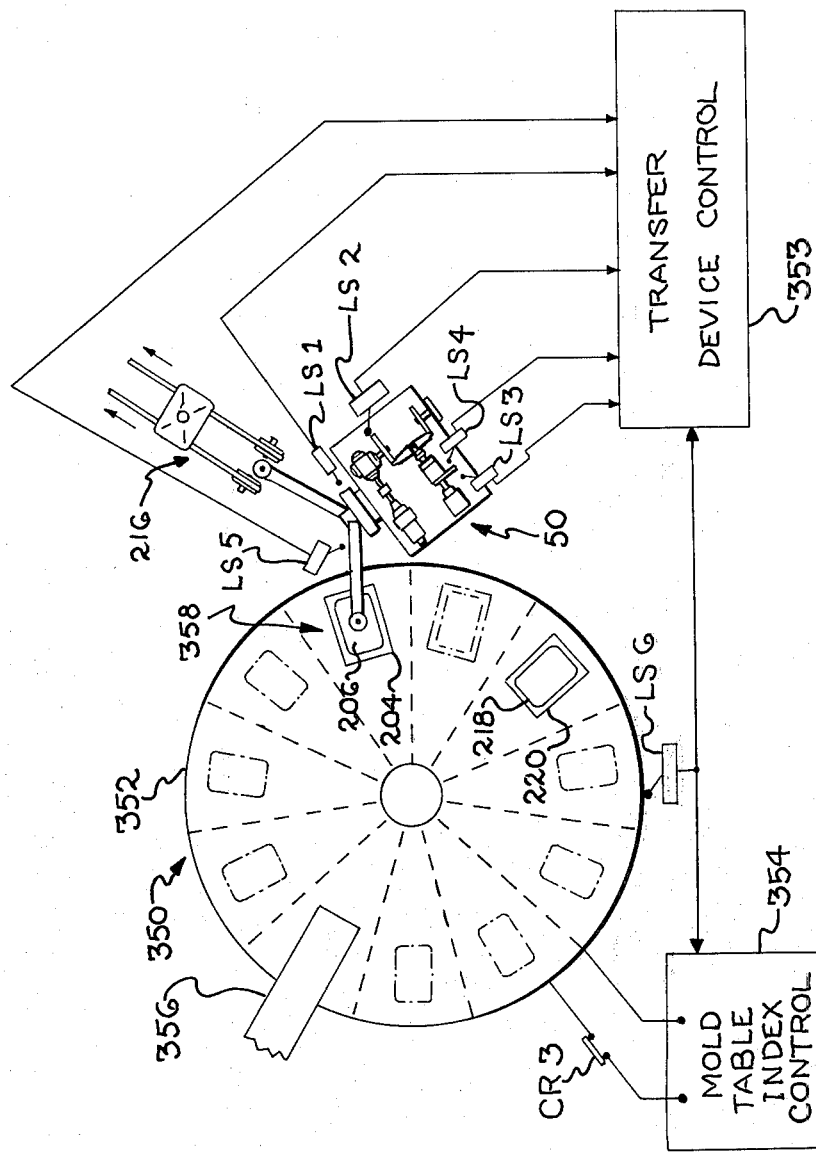
FIG. 10 is a schematic plan view of the transfer device embodying the teachings of this invention disposed in an article transferring position between an indexing table of a centrifugal casting machine and a conveyor device for receiving articles from the transfer apparatus and removing them to the next operation.

The indexing hub 130 and the arms 200, 202 are locked in the inverted position shown in FIGS. 5e and 5f by the clutch mechanism to be described hereinafter, and the post or chuck holder 210 of the arm 200 is passed vertically downwardly between split or spaced workpiece receiving, conveyor elements diagrammatically illustrated at 216 at a deposit station, causing the workpiece 206 to be stripped from the chuck 208 and remain on the conveyor means 216. The vacuum is removed from the chuck 208 after the chuck 208 has been inverted and during the downward vertical travel to enable the workpiece stripping action to occur without the buildup of any substantial workpiece removal forces between the chuck 208 and the conveyor means 216 which would damage the workpiece 206 or cause misalignment of the components workpiece transfer mechanism 50. A plan view of a conveyor means 216 having separated runs of endless belts for receiving and stripping workpieces from the vacuum chucks is shown in FIG. 10.

The continued downward travel of the indexing hub assembly 80 will return the indexing hub assembly to the article pickup position. The vacuum chuck 214 is inserted into the next workpiece 218 in a mold 220 which has been indexed into, as the mold 204 was indexed out of, the workpiece transfer position or article pickup station during the transfer cycle of the transfer device 50.

During the downward travel of the assembly 80, the sheave drive sprockets 102, 116 have rotated the sheaves 164, 146 in the opposite direction, unwinding the cable 140 from the upper sheave 164 and rewinding the cable on the sheave 146, to return the cable 140 to the starting layout position shown in FIG. 4. During this rewinding process the hub drum 134 is rotated freely, since the clutch mechanism is disengaged, and returns to its starting position. When the hub drum 134 reaches the starting position the clutch mechanism once again connects the drum 134 to rotate the hub 130 and the next transfer cycle is ready to start. Upon sensing the arrival of the assembly 80 at the starting position, the drive motor 92 may be energized in the reverse direction to start the next transfer cycle.

Figure 6A:
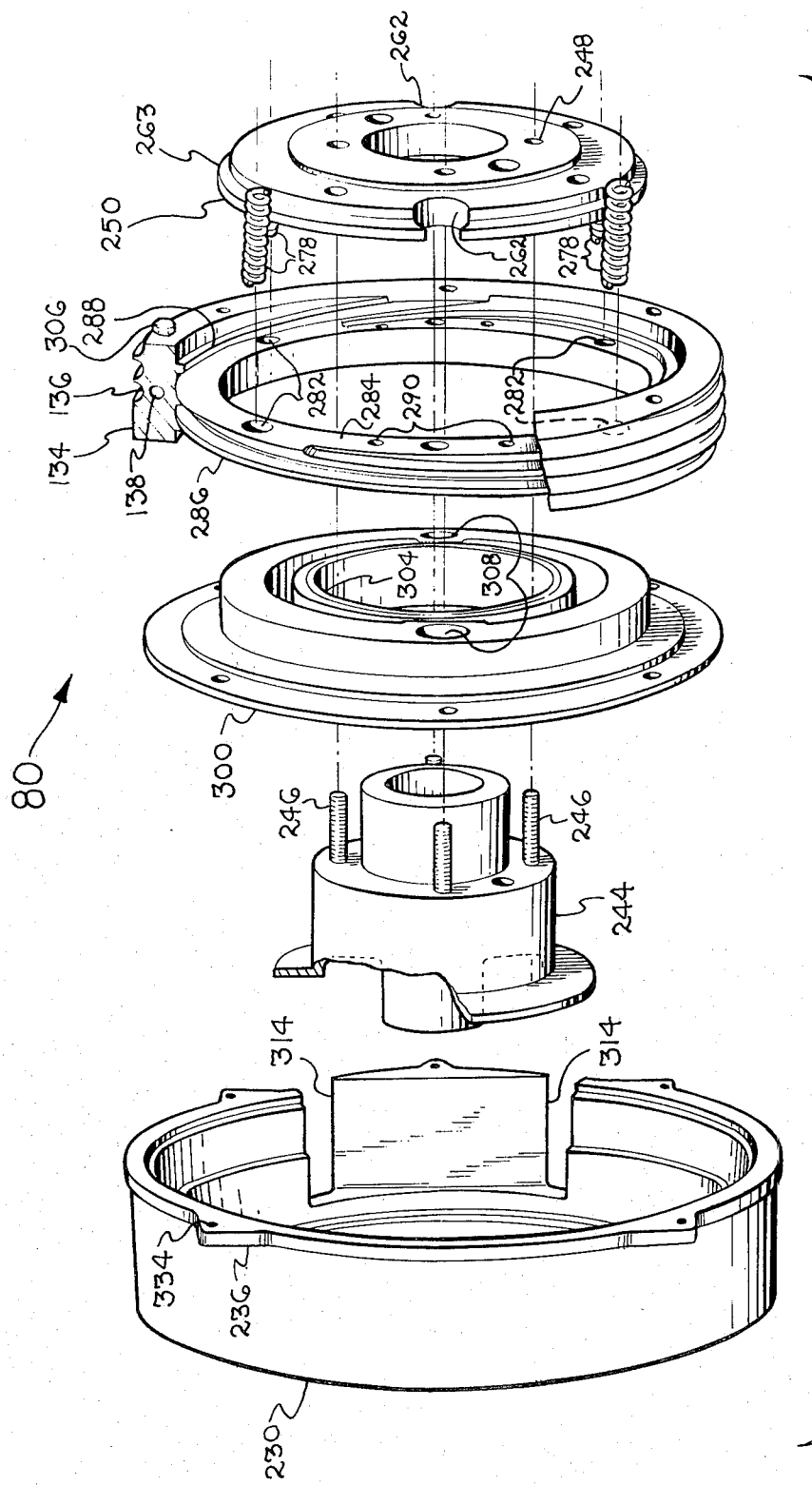
FIGS. 6a and 6b show an exploded view of the components utilized in the carrier housing, the rotatable drum means, the automatic mechanical clutch, and the indexing hub of this invention.
Figure 6B:
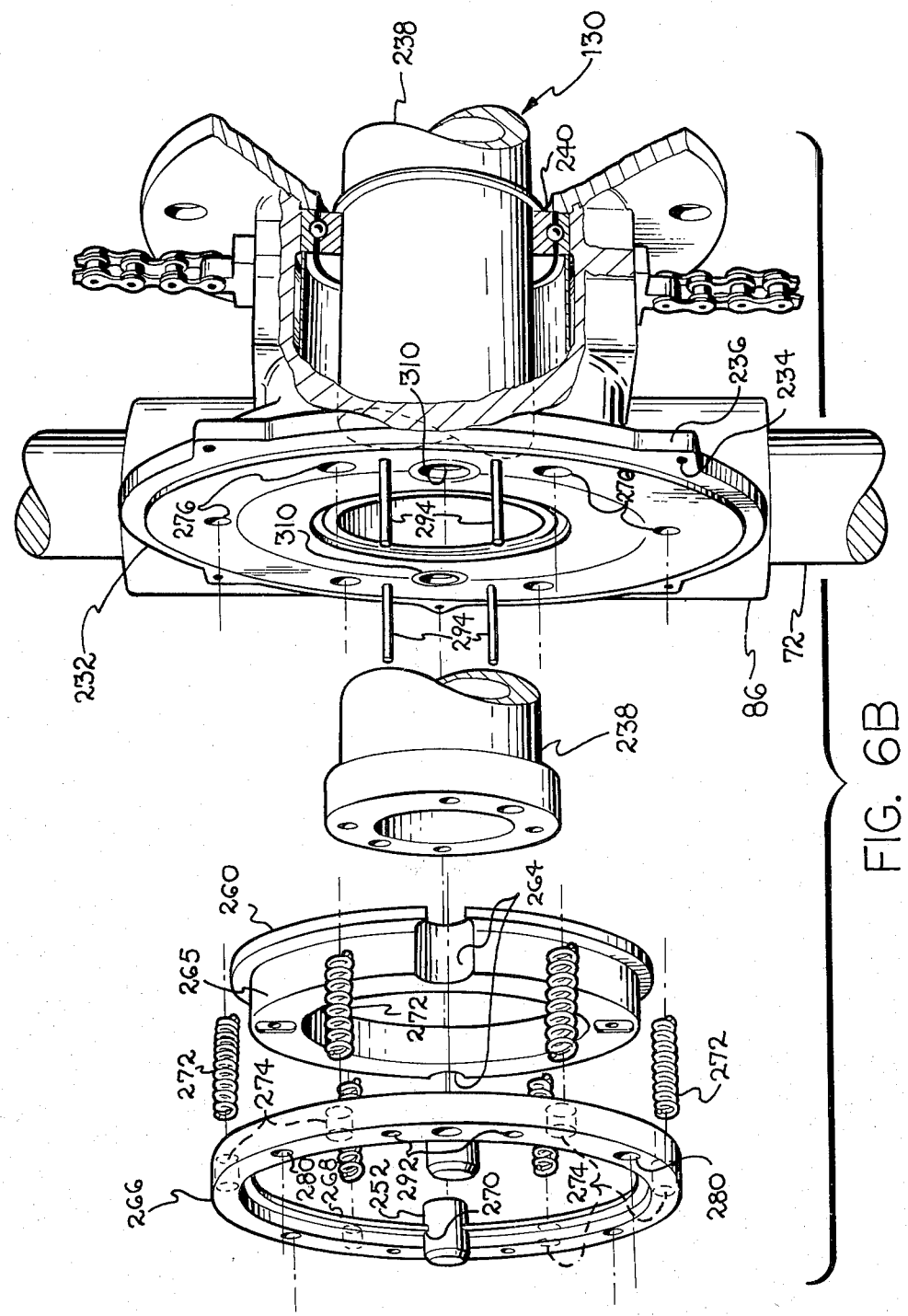
Figure 7:
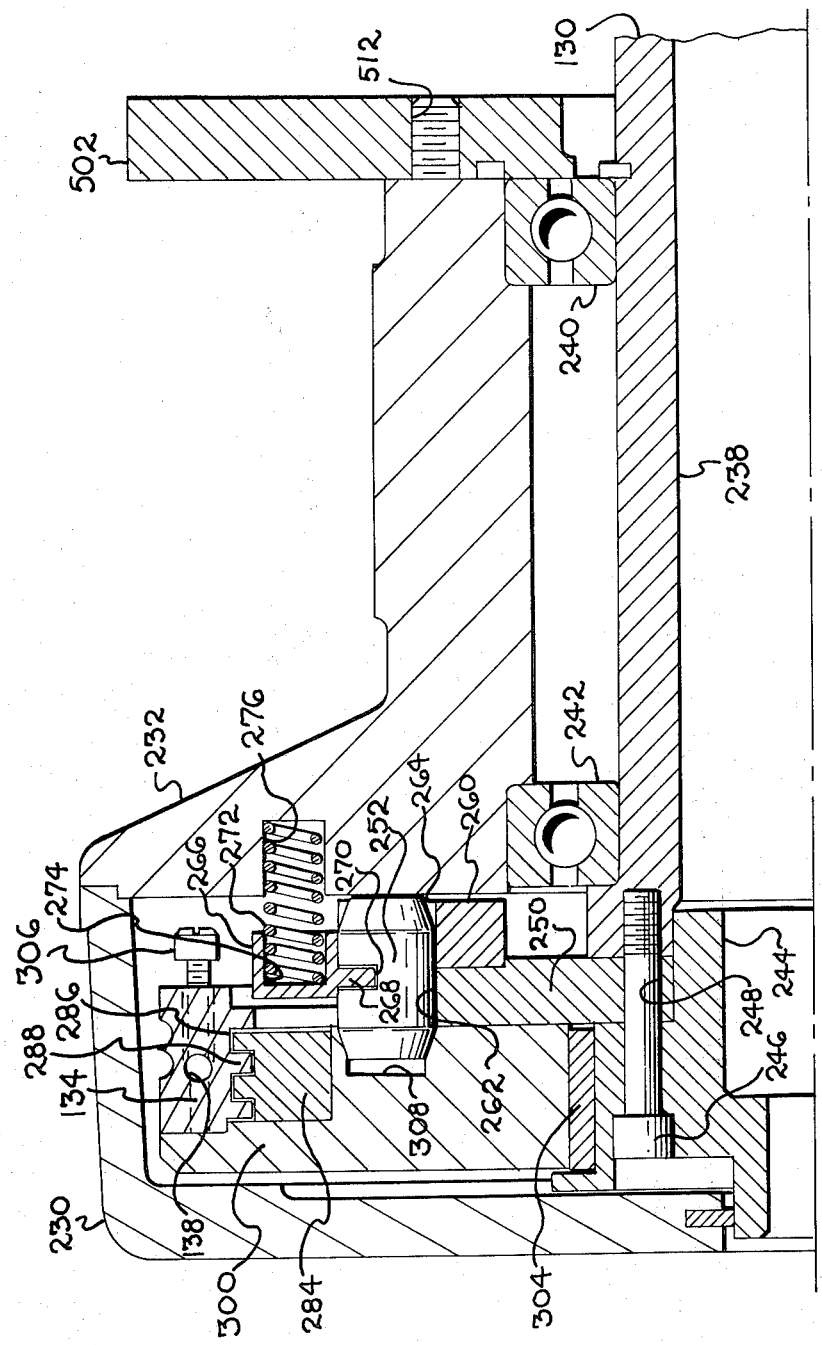
FIG. 7 is a cross-sectional view of the components illustrated in FIGS. 6a and 6b when assembled, the view showing the connection of the rotatable cable drum to rotate the indexing hub.

Referring now to FIGS. 6a, 6b, 7, 8 and 9, there is shown an exploded view of the indexing hub assembly 80 in FIGS. 6a and 6b, a cross-sectional view of the clutch engaging the indexing hub 130 to the cable drum 134 in FIG. 7, a cross-sectional view showing the relative positioning and guidance thereof of the components of the clutch assembly in FIG. 8, and the relative position of the components when the clutch mechanism engages the indexing hub 130 to the hub carrier housing 82 in FIG. 9. FIGS. 6a and 6b have been drawn on two sheets, and should be viewed together, placing FIG. 6a on the left and FIG. 6b on the right. The use of two sheets enables a larger and clearer showing of the details. Since the two sheets should be viewed together, FIGS. 6a and 6b will be referred to hereinafter only as FIG. 6.

The indexing hub carrier 82 includes a rear housing section 230 and a forward housing section 232 suitably joined together, as by bolts through holes 234 formed through ear flanges 236 extending outwardly from each section as shown in FIG. 6.

The indexing hub indicated generally at 130 includes a hollow axle 238 rotatably mounted in ball bearings 240, 242, seated in the forward housing section 232 (best seen in FIG. 7). The indexing hub 130 further includes a hollow end cap 244 joined to the rear of the axle 238 by bolts 246 which also extend through bolt holes 248 formed in a rear shot pin holder and guide 250 for shot pins 252. The bolts 246 thus retain the rear pin holder 250 between the end cap 244 and the axle 238 of the indexing hub 130 and joined therewith to rotate when the indexing hub 130 rotates. The shot pin holder 250 is disc shaped and extends outwardly from the indexing hub 130.

A disc shaped forward shot pin holder and guide 260 for the shot pins 252 is secured to and rotatable with the shot pin guide 250 by bolts 261 (shown in FIG. 8), when the end cap 244 and hub axle 238 of the hub 130 are rotated. Guide slots 262, 264 are formed in the holder and guide elements 250, 260, respectively, and are aligned with and mate with each other to permit the shot pins 252 to slide rearwardly or forwardly. Although only one of the guide slot arrangements 262, 264 is shown in the cross-sectional views there are, as illustrated in FIG. 6, two shot pin guide slot arrangements which are diametrically opposed, that is spaced 180° apart around the outside of the periphery of the shot pin holder means 250, 260.

A shot pin shifter collar 266 has an inwardly extending flange 268 which is received in slots 270 formed in the outer side of the shot pins 252. The outer rims of the shot pin holders 250, 260 have annular recesses 263, 265 formed in the mating surfaces thereof to permit forward and reverse axial movements of the flange 268 of the shot pin shift collar 266 (best seen in FIG. 8).

To shift the shot pin collar 266 rearwardly, a plurality of springs 272 are mounted in compression between spring seats 274 formed in the forward face of the shift collar 266 and spring seats 276 formed in the rear face of the forward housing section 232 (best seen in FIGS. 6 and 7). To shift the slot pin collar 266 forwardly, a plurality of springs 278 are mounted in compression between spring seats 280 formed in the rear face of the shifter collar 266 and spring seats 282 formed in the forward face of a clutch action spring holder 284. (Best seen in FIGS. 6 and 9.)

The clutch action spring holder 284 has screw threads 286 formed on the external periphery thereof which engage and mate with screw threads 288 formed on the inner face of the annular hub cable drum 134. The clutch action spring holder 284 and the shot pin shift collar 266 have guide apertures 290, 292 formed therethrough which slidably receive a plurality of guide rods 294 supported in bores 296 formed in the forward housing section 232. (Best seen in FIG. 8.) The guide rods 294 maintain the respective spring seats in alignment and permit movement of the spring holder 284 and the shift collar 266 in forward and reverse directions axially along the indexing hub 130, while preventing rotational movement thereof.

A hub cable drum support member 300 is secured to the hub cable drum 134 by bolts 302 (best seen in FIG. 8), and is rotatably mounted on a bushing or bearing means 304 carried on the external periphery of the end cap 244 of the indexing hub 130.

The cable receiving bore 138 formed in the hub cable drum 134 is shown in FIGS. 6 and 7, with a set screw 306 extending inwardly from the forward face of the hub cable drum 134 to retain the cable 140 in place in the bore 138.

A pair of indexing shot pin receiving seats 308 are formed in and spaced 180° apart in the forward face of the hub cable drum support 300 (best seen in FIGS. 6 and 7). A pair of stationary shot pin receiving seats 310 are formed in and spaced 180° apart in the rear face of the forward housing section 232 (best seen in FIGS. 6 and 9). Each of the shot pin seats 308, 310 have flared openings to aid in the reception of and disengagement of the chamfered forward and rear ends of the shot pins 252.

A slot 314 is formed in the rear housing section 230 (best seen in FIG. 6) tangentially with respect to and extending along the periphery of the hub cable drum 134. The slot 314 permits the vertical entry and exit of cable 140 from the rear housing section 230 while the cable is in engagement with the hub cable drum 134 in the cable receiving groove 136 formed thereon.

The purpose of the indexing hub assembly 80 is to connect the pickup arms 200, 202 mounted on the hub 130 to the hub cable drum 132 for rotation during upward travel of the hub carrier 82, and to lock the hub 130 and arms 200, 202 to the non-rotating hub carrier housing section 232 of the carrier 82 during the downward travel of the carrier 82. This enables the hub 130 and the arms 200, 202 mounted thereon to be rotated 180° on the way up, and to be held stationary in a horizontal position on the way down as described hereinbefore and shown in FIGS. 5a through 5f.

The clutch mechanism for selectively connecting the hub 130 first with the hub cable drum 132 and then with the housing 232, includes the shot pin holder means 250, 260 secured to and rotatable with the indexing hub 130; the shot pins 252 slidably held in the slot arrangements 262, 264 spaced 180° apart and formed in the shot pin holder means; the shot pin shifter collar 266 which engages the shot pins 252 with its inwardly extending flange 268 in the slots 270 formed in the shot pins 262; springs 272 which yieldingly urge the shift collar 266 rearwardly; springs 278 which yieldingly urge the collar 266 forwardly; and the clutch action spring holder 284 which retains and compresses springs 278 between the spring holder 284 and the shift collar 266, and which is moved forwardly and rearwardly axially along the indexing hub 130 by the cooperating engagement of the outwardly extending screw threads 286 with the inwardly extending screw threads 288 of the cable drum 132.

When the hub carrier 82 starts upwardly, the shot pins 252 are urged into and received by the seats 308 of the cable drum holder 300 in response to the force exerted rearwardly on the shift collar 266 by springs 272, as shown in FIG. 7. The drum holder 300 and the drum 134 may be considered the input element of the clutch. The forward force of springs 278 (shown in FIGS. 6 and 9) on the shift collar 266 has been reduced below the rearward spring force exerted by the springs 272 since the clutch action spring holder 284 has been retracted to its rearmost position shown in FIG. 7 by the screw thread engagement with drum 134 as the drum 134 was rotated during the downward travel of the indexing hub carrier 82. This moves the clutch action spring holder 284 far enough away from the shift collar 266 so that by selecting proper relative spring force, the spring force of the set of springs 272 will prevail over the spring force of the set of springs 278 when the clutch action spring holder 284 has been backed away from the shifter collar 266 by the hub cable drum 134.

Thus, at the bottom of travel of the carrier 82 at the article pickup position, the shot pins 252 will be shifted into the seats 308 in the cable drum holder 300, even though the seats 310 formed in the forward housing section 232 are in alignment with and could receive the shot pins 252.

After the initial or first portion of upward travel of the hub carrier housing 82, when there is no rotation of the hub cable drum 134 as explained hereinbefore, the hub cable drum 134 starts to rotate counterclockwise during the second portion of travel of the hub carrier 82 in response to a rate of cable payout and takeup which differs from the vertical travel rate of the hub carrier 82. The counterclockwise rotation of the hub cable drum and of the drum holder 300 on bushing 304 thus also rotates hub 130 in a counterclockwise direction. The indexing hub 130 may be considered the output element of the clutch mechanism. The shot pins 252 are engaged in the seats 308 of the drum holder 300 and transmit the counterclockwise rotational force through the shot pin holder means 250, 260 to the end cap 244-axle 238 combination of the indexing hub 130 via the bolts 246 securing the shot pin holder means to the indexing hub. The clockwise and counterclockwise directions of rotation in the description of the clutch assembly are those directions as viewed from the arm side or front side of the indexing hub assembly 80.

The initial counterclockwise rotation of the hub 130-shot pin holder means 250, 260 moves the pins 252 in a circular travel path around the rear face of the forward housing section 232 away from alignment with the shot pin seats 310 formed in the forward housing section 232. The diametrically opposed shock pins 252 will not be in alignment with the diametrically opposed and 180° spacing of the seats 310 again until the shot pins 252 and thus the hub 130-arms 200, 202 have rotated 180°. Therefore the spring force exerted rearwardly by springs 272 needs to be greater than or superior to the spring force exerted forwardly by the springs 278 when the shot pins 252 are in alignment with the stationary seats 310 formed in the forward housing section 232 and when the pins are just leaving or clearing the area immediately clockwise adjacent the seats 210, during the start of a transfer cycle initiating counterclockwise rotation of the shot pins 252 and hub cable drum 134 during initial upward travel of the hub carrier 82.

The spring force exerted rearwardly by the springs 272 also needs to be greater than or superior to the spring force exerted forwardly by the springs 278 when the shot pins 252 are entering the area immediately adjacent the seats 308 at the end of the downward travel of carrier 82 and at the end of a clockwise rotation of the hub cable drum 134 to enable the pins to be urged toward and into the seats 308 and urged away from their position in the seats 310.

The cross-sectional view in FIG. 7 is taken when the shot pins 252 have left an alignment position with the seats 310 during the second portion of the upward travel of the hub carrier 82 after the indexing hub 130 has been started in the counterclockwise rotation. It can be seen then, that the shot pins 252 cannot move axially forwardly when in the position in FIG. 7, regardless of the relative spring forces exerted, because the shot pins 252 will merely ride on the rear face of the forward housing section 232 in a circular path for the 180° of counterclockwise rotation until the pins have an opportunity to enter the seats 310 formed in the rear face of the forward housing section 232.

As the cable drum 134 rotates counterclockwise during the upward vertical travel of the hub carrier 82, the rotational inner engagement between the screw threads 288 of the hub cable drum 134 and the screw threads 286 of the clutch action spring holder 284 will advance the spring holder 284 axially forwardly toward the shift collar 266. The spring holder 284 and the collar 266 are axially slidably guided on and are prevented from rotation by the guide rods 294 (shown in FIG. 8). The spring holder 284 slides forwardly on the guide rods 294 which extend through the guide bores 290 formed in holder 284.

The advancement of the spring holder 284 toward the shift collar 266 compresses the springs 278 held therebetween until, sometime before the end of the 180° rotation of the indexing hub 130, the spring force exerted forwardly by the springs 278 exceeds the spring force exerted rearwardly by the springs 272. In response to the shift in the resultant spring force exerted, the collar 266 is then yieldingly urged forwardly. However, the shot pins 252 will merely ride in a circular path on the rear face of the forward housing section 232, until the 180° rotation of the indexing hub 130, and thus the 180° rotation of the shot pin holder and guide means 250, 260 is completed and alignment of the shot pins 252 with the seats 310 in the forward housing section 232 is attained.

The shift collar 266 will then urge the shot pins 252 forwardly into the seats 310 in response to the then superior spring force of the springs 278. The forward spring force of springs 278 is transmitted to the shot pins 252 via the inwardly extending flange 268 of the shift collar 266 which engages the slots 270 formed in the shot pins 252. The collar 266 will slide forwardly on the guide rods 294 extending through bores 292 formed in collar 266 (see FIG. 8).

The seating of the shot pins 252 in the seats 310, the forward position of the shift collar 266, and the advanced or forward position of the clutch action spring holder 284 is illustrated in FIG. 9. This figure is also illustrative of the relative position of the clutch components after the carrier 82 has reached the top of the vertical travel and has started its downward travel, and of the clockwise rotation of drum 134 and holder 300 to move the seats 308 out of alignment with the seats 310. The arms 200, 202 have been rotated 180° and are in the position shown in FIG. 5f.

When the hub carrier 82 starts its downward travel, as explained hereinbefore, the sheave 146 rewinds and the sheave 164 unwinds the cable 140 to return the cable 140 to the position shown in FIG. 4 at the end of the downward travel, readying the transfer device 50 for its next transfer cycle.

The hub cable drum 134 is rotated clockwise during the downward travel of the hub carrier 82, but has no effect on the indexing hub 130 since it is not connected thereto by the clutch mechanism. The relatively greater spring force of the springs 278, when the hub carrier 82 is at the top of its vertical travel, retains the shot pins 252 in the stationary seats 310 formed in the housing section 232 of the carrier 82, until the clockwise rotation of the hub cable drum 134 moves the drum holder 300 and thus seats 308 out of alignment with the now stationary shot pins 252.

The clockwise rotation of the hub cable drum 134 moves the clutch action spring holder 284 rearwardly, but the relative spring forces of springs 278, 272 are such that the shot pins 252 are maintained in the stationary seats 310 until the indexing seats 308 have been rotated clockwise out of alignment with the shot pins 252 as just noted. When the indexing pin-receiving seats 308 have been moved out of alignment with the now stationary pins 252, then the relative strength of the two spring forces does not matter since the shot pins cannot move out of the seats 310 and would merely ride on the forward face of the cable drum holder 300, as illustrated in FIG. 9.

As the carrier 82 continues downwardly the clockwise rotation of the hub cable drum 134 will withdraw or retract the clutch action spring holder 284 rearwardly, until the holder 284 is far enough away from the shift collar 266 so that the compression of the springs 278 is reduced to a point where the spring force of the springs 276 becomes superior. As the hub carrier 82 nears the bottom of its travel, the seats 308 in the cable drum holder 300 will have been rotated clockwise almost into alignment with the shot pins 252 and the stationary seats 310. The clutch action spring holder 284 will have been retracted rearwardly toward its initial cycle-start position, and the now superior force of the springs 272 will urge the shift collar 266 rearwardly.

The flange 268 of a shift collar 266 then pushes or shifts the shot pins 252 out of the stationary seats 310 in the forward housing section 232 and into the indexing seats 308 in the rotatable cable drum holder 300. However, since the hub carrier 82 has reached the point on its downward travel where the cable payout and takeup rate of the cable sheaves 164, 146 is equal to the vertical travel rate of the hub carrier 82, the hub cable drum 134 is not rotated and the arms 200, 202 stay in their horizontal position until the downward travel of the hub carrier 82 is completed.

Since the indexing hub 130 is maintained in a stationary position during the downward travel of the hub carrier 82, the arms 200, 202 will be maintained in a horizontal position during the downward travel of the hub carrier 82. Therefore, the workpiece 206 is stripped from the arm 200 onto the conveyor means 216, and vertical entry of the vacuum chuck 214 on the post 212 now depending vertically from the arm 202 is enabled into the next workpiece 218 to be transferred from the next mold 220. The mold 220 has been indexed into transfer position during the just described execution of the transfer cycle of the transfer device 50. The transfer cycle is now completed and a new cycle may begin.

In summary, the shot pin shifting ring or collar 266; the springs 272, 278; the clutch action spring holder 284; and the hub housing sections 230, 232 never rotate. The shot pins 252; the shot pin holder means 250, 260; the indexing hub 130; and the pickup arms 200, 202 rotate during upward travel but not during downward travel. The hub cable drum 134, including the indexing shot pin seats 308 and the screw thread 288 formed on the interior surface thereof, rotates one way while the hub carrier is traveling up and the other way while the hub carrier is traveling down.

Referring now to FIGS. 10 through 16, there are illustrated hydraulic and electrical control systems for the transfer device 50, the control components, and the relative positions of the components.

In FIG. 10 there is illustrated diagrammatically in a plan view a molding machine indicated generally at 350, adjacent the transfer device 50, with the workpiece removal conveyor 216 being located as shown on the other side of the transfer device 50.

The molding machine 350 is mounted on a base and has a mold table 352 carrying thereon a plurality of mold units as noted at 204, 220 arranged in an annular series around the center of the table 352. The mold table 352 is rotated intermittently, step by step, by means of an indexing table drive mechanism as directed by an index control unit 354, both known in the prior art.

Each mold unit is brought by indexing rotation to a plurality of stations around the perimeter of the table, in this instance eleven stations. The stations may include a mold charging or feeder station 356, a station or stations at which the article is formed in the mold, intermediate cooling stations at which the article is cooled into the final form, and a take-out station 358. The plurality of stations may also include stations at which the mold is empty. The location of the charging or feeder station and the take-out station is illustrative only, as is the use of the rotating molding machine as opposed to an in-line molding machine or other article forming or delivering devices useful with the transfer device 50.

In this instance each stepwise rotation or index of the mold table 352 is through an angular distance twice the distance between adjoining operation stations so that an article travels more than one complete rotation of the mold table 352 from the feeding or charging station 356 before it arrives at the take-out section 358. Thus, the mold 204 which is shown at the take out station 358 is spaced two mold positions from the next mold 220 that will appear at the take out station 358. Again, two step indexing is illustrative only.

Figure 11:
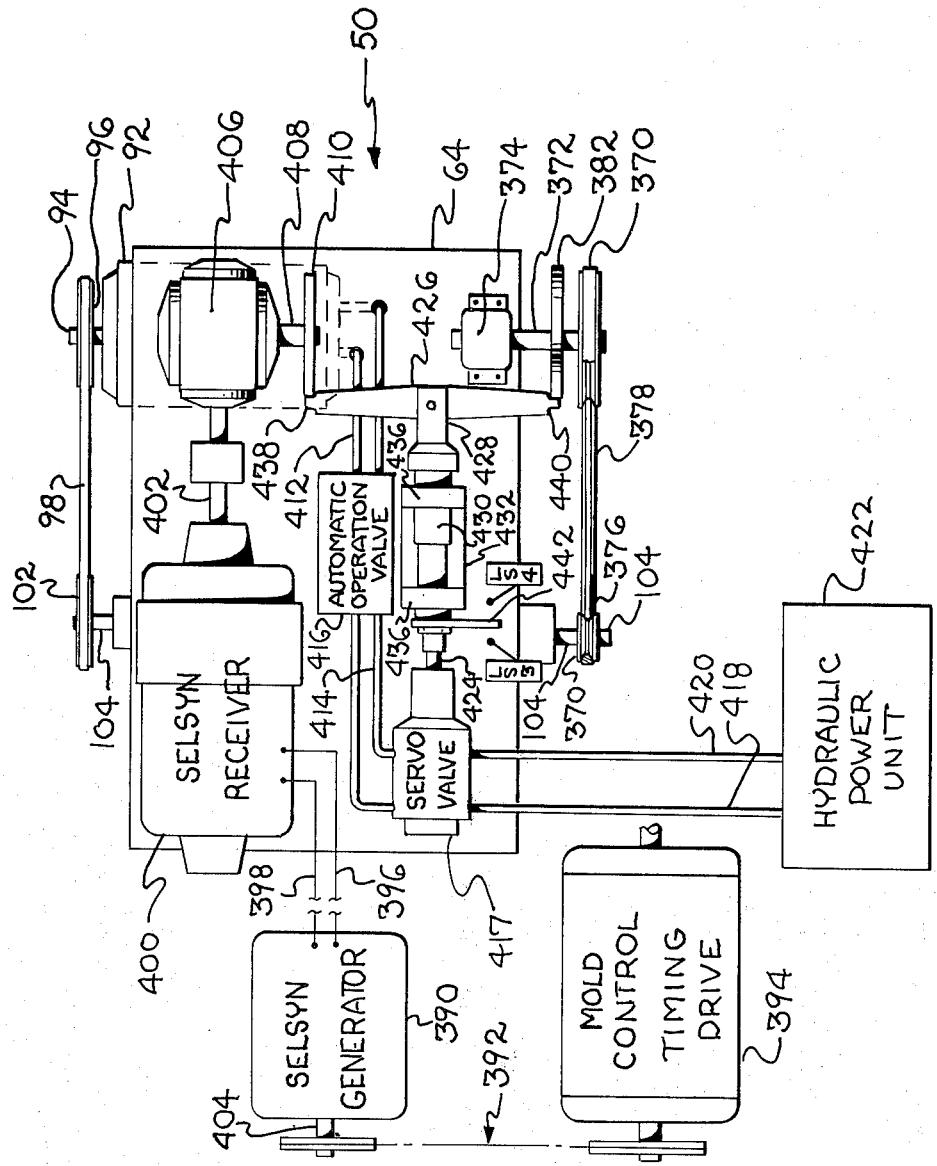
FIG. 11 is a schematic plan view illustrating the hydraulic drive for the transfer device of this invention.
Figure 12:
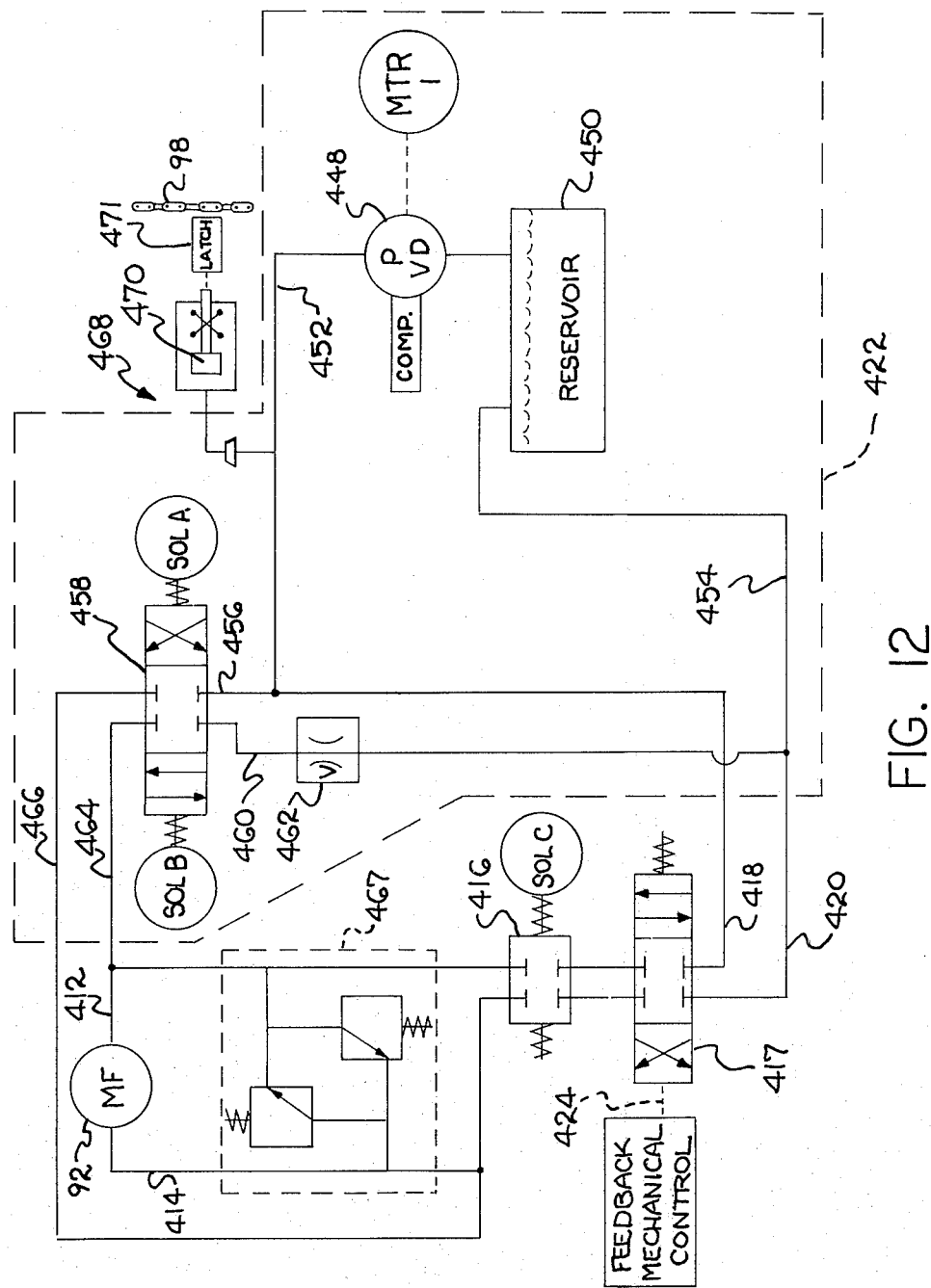
FIG. 12 is a schematic diagram illustrating the hydraulic control system of this invention.

Referring to FIG. 11, there is illustrated an enlarged top view of the transfer device as illustrated in FIG. 10, to enable showing more detail, along with the components of the synchronized power system for driving the fluid motor 92 to rotate the chain drive sprocket 96 and move the chain section 98 to lift and lower the indexing hub assembly 80. FIG. 12 shows a schematic diagram of the hydraulic control system utilized in FIG. 11, and should be viewed along with FIG. 11.

Referring now to FIG. 11, a feedback sprocket 370 is fixedly mounted on a feedback sprocket shaft 372 which is journally supported in a bearing block means 374 mounted on the top of the upper housing 64 of the frame 60. A feedback coupling sprocket 376 is fixedly mounted on the shaft 104 journally carried in the upper housing 64. The shaft 104 has fixed on the other end thereof the sprocket 102 which is driven by the chain section 98. Therefore, the feedback sprocket 376 is responsive to all of the vertical movements of the indexing hub assembly 80.

A timing chain 378 is trained around sprockets 370, 376 and around an idler sprocket 380. The idler sprocket 380 is now shown in FIG. 11 for purposes of clarity, but is shown along with the other sprocket and chain feedback components in FIGS. 1 through 3.

A feedback cam 382 (also shown in an enlarged side elevational view in FIG. 14) is fixedly mounted on the shaft 372 and rotatable with the feedback sprocket 370.

A selsyn generator or transmitter 390 is associated with the mold index control unit 354 of FIG. 10 and is driven via a timing chain drive means indicated generally at 392 by a mold indexing control timing drive 394 in the control unit 354. The timing drive 394 determines the control sequences for the molding machine, including the indexing movements of the table 352. The timing drive shown for unit 394 is meant only to be representative of a timing drum, or any other sequence timing means for the control unit 354 from which a rotational movement can be attained which represents the control cycle for the control unit 354.

The selsyn generator 390 transmits control signals via leads 396, 398 to a selsyn receiver or slave motor 400. In response to signals on leads 396, 398, the shaft 402 of the selsyn slave motor 400 will assume an angular position which duplicates the position of the shaft 404 of the selsyn transmitter 390. Since the shaft 404 of the transmitter 390 is angularly positioned by the timing drive 394, the shaft 402 of the selsyn receiver provides a remote indication of the timing cycle of the mold table control 354.

The slave motor shaft 402 is coupled to a gear reducer 406 having an output shaft 408. A program cam 410 is fixedly mounted on shaft 408 and has a peripheral cam track contour which enables control of the lifting and lowering of the indexing hub assembly 80 by the fluid motor 92. An enlarged side elevational view of the program cam 410 is shown in FIG. 13.

Hydraulic fluid for the chain drive motor 92 is supplied via conduits 412, 414 and a valve 416, which enables automatic operation of the transfer device, from a servo valve 417. Hydraulic fluid is supplied to the servo valve 417 by conduits 418, 420 from a hydraulic power unit 422 (shown schematically in FIG. 12).

Control of the amount and direction of flow of fluids through the conduits 412, 414 from the servo valve 417 is accomplished by connecting a plunger 424 of the valve 417 to a differential lever 426 pivotally mounted at 428 in a clevis formed in one end of a lever-plunger coupling 430. The coupling 430 is slidably supported in a support element 432 having spaced standards 434, 436 with axially aligned bores formed therethrough for slidably receiving the coupling 430.

A cam follower end 438 of the differential lever 426 rides against the peripheral cam surface of the program cam 410. The other cam follower end 440 of the lever 426 rides against the peripheral cam surface of the feedback cam 382.

A limit switch tab 442 is carried by the coupling 430 and extends outwardly to actuate limit switches LS3 or LS4 in response to a large signal imbalance applied to the servo valve 417, the large signal imbalance being indicated by an extreme position of the plunger 424 to the right or to the left as viewed in FIG. 11.

Referring now to FIG. 12, the schematic diagram of the hydraulic system shows that the hydraulic power unit variable volume pump 448. The pump need not be of the variable volume type, but the pump unit output must adjust to variable volume demands by a relief valve or other compensating method. The pump 448 provides fluid under pressure from a reservoir 450 through a main supply conduit 452. Fluid is returned to the reservoir via a main return conduit 454.

A branch 456 of the supply conduit 452 is connected to a manual operation valve 458. A branch 460 of the return conduit 454 returns fluid from the valve 458 to the main return conduit 452 via a manual speed control valve 462. The manual operation valve 458 is connected to the motor energizing or driving conduits 412, 414 by conduits 464, 466.

The variable volume pump 448 is compensated automatically as noted schematically in FIG. 12 to maintain a nearly constant preset pressure while the displacement is varied according to demand. The power to the electric motor MTR1 is supplied through the electrical control system illustrated in FIG. 16 which will be discussed in detail hereinafter. A pressure relief valve connected in conduit 452 and/or a heat exchanger unit connected in return conduit 454 may be utilized although not shown in FIG. 12.

The hydraulic motor 92 preferably contains internal speed reduction so that it may be coupled directly to the chain drive sprocket shaft 94 to raise and lower the indexing hub assembly 80 by the chain section 98 on the sprocket 96.

The servo valve 417 is responsive to movement of the differential lever and the program and feedback cams via the mechanical linkage to the plunger 424. A normal four-way servo valve has been modified as illustrated in FIGS. 15a and 15b to serve as a precise null center servo valve. The valve spool 472 of the servo valve 417 has bleed spots 473 and 474 formed on the outside of and the inside of the peripheries of the spaced lands 475 to provide a zero null position on center. Slight movement either side of center of the spool indicated at 472 will induce pressure and flow to the hydraulic motor 92 in response to movement of the plunger 424.

Figure 16:
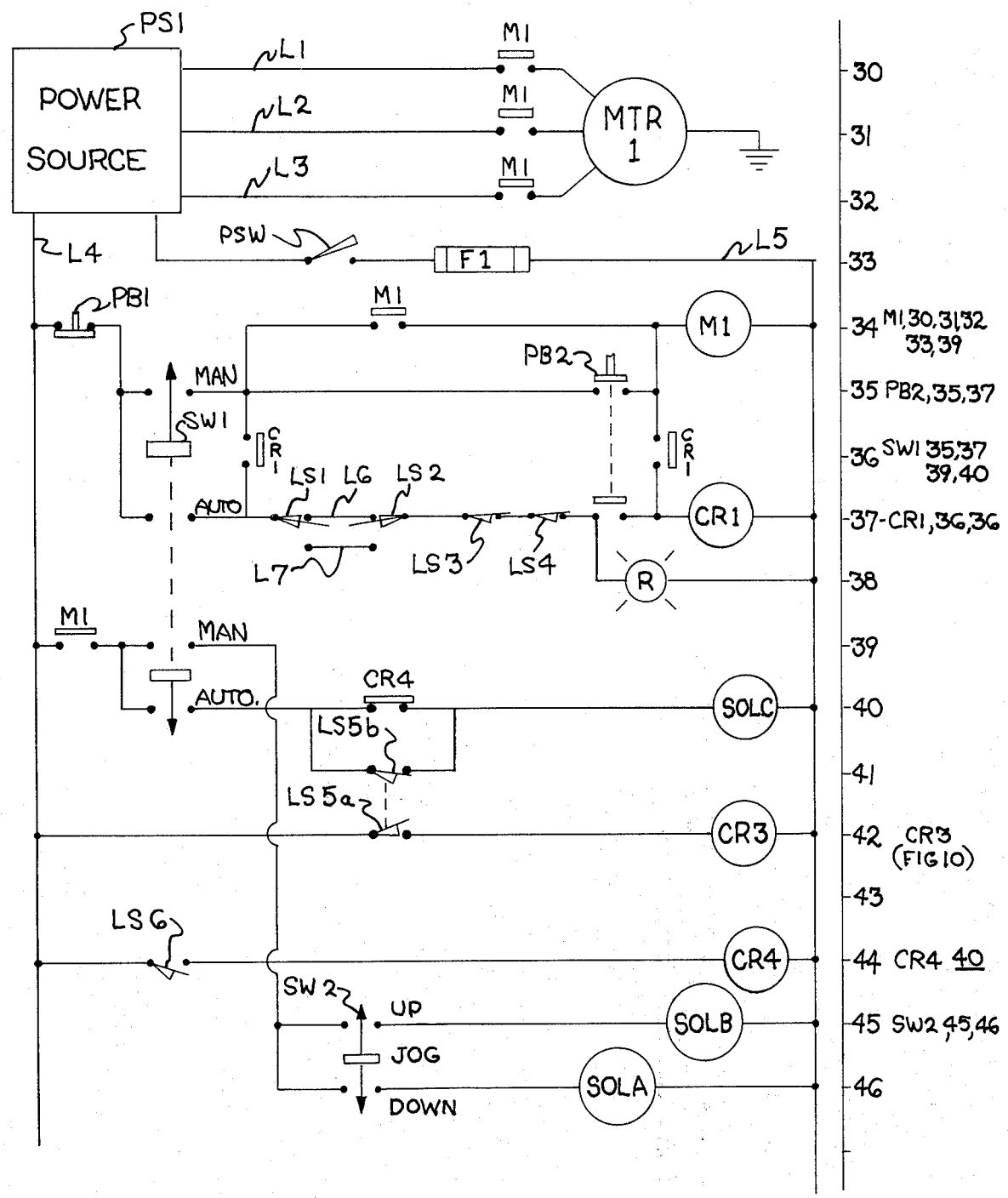
FIG. 16 is a schematic diagram of an electrical control system useful with the transfer apparatus disclosed herein.

The manual control valve 458 is a double solenoid four-way valve which enables control of the transfer device by manual operation by the jog switch SW2 illustrated in FIG. 16, and the resultant actuation of solenoids SOLA and SOLB. The manual valve 458 bypasses the servo valve 417 and automatic valve 416 for manual operation.

The single solenoid valve 416 is a two-position four-way valve which may be mounted either under or on top of the top platen of the upper housing 64 of the transfer device 50, as shown in FIG. 11. It is actuated by energizing the solenoid SOLC during automatic operation to connect the servo valve 417 to the system, and to block the conduits 418, 420 from the hydraulic motor 92 at all other times so that the manual valve 458 may be used to control the system.

The manual speed valve 462 is connected in return conduit 460 from the manual operation valve 458 and may be adjusted to throttle the flow of fluid, during manual operation only, to prevent violent movement of the indexing hub assembly 80. A dual peak pressure bypass release valve is indicated at 467 and is connected across conduits 412, 414 supplying the fluid motor 92 to relieve excessive pressure peaks from either side of the control system to the other when the power is shut off and the valves suddenly block the flow of hydraulic fluid.

A mechanical hold device is indicated generally at 468 in FIG. 12 and includes a plunger 470 which is responsive to pressure in the main supply conduit 452 to disengage a latch mechanism 471 from the drive chain 98. Thus, when the power is off, the indexing hub assembly 80 cannot drift from the position held at the time the power was cut off.

Referring to FIG. 13, the program cam 410 has a 360° input cam surface with progresses through a zero degree or "hub down" point 476, a 90° point 478, a 180° or "hub up" point 480, and a 270° point 482. The program cam 410 is shown as it would appear when the point 480 is touching the cam follower end 438 of the differential lever 426 as viewed from the rear of the transfer device 50. As will be noted hereinafter this would be a convenient starting position for the indexing hub assembly 80 to coordinate its operation with an indexing molding machine. Starting can also begin at any point or position of the cycle above the point where a limit switch LS5 is actuated in the control circuit to be described hereinafter. The transfer cycle must be coordinated with the cycle of the molding machine.

From the point 480 the program cam 410 has a peripheral contour or cam track 484 with a radial dimension that diminishes with respect to the center 486 of rotation of the cam 410 through the point 482 back to the zero or "hub down" point 476. The program cam 410 is rotated counterclockwise in the direction shown by the arrow by the selsyn slave motor 400 through the gear reducer 406. From the zero or "hub down" point 476 the radial dimension of the peripheral contour 484 increases through the point 478 back to the maximum dimension at the "hub up" point 480. The program cam 410 will complete one such revolution for each cycle of the transfer device 50.

Referring now to FIG. 14, the feedback cam 382 is shown as it would appear when it is mounted on the shaft 372 and viewed from the rear of the transfer device 50. A hub up point 488 on the peripheral contour or cam track 490 would normally be touching the cam follower end 440 of the differential lever 426 at the preferred hub up starting position of the transfer device 50. The radial dimension of the cam contour 490 constantly incrementally increases with respect to a center of rotation 492 for 360° until a hub down point 494 is reached.

The feedback cam 382 is rotated in a counterclockwise direction as viewed from the rear of the transfer device 50 during one-half of the cycle of the transfer device when the index hub assembly 80 is being lowered. A reversal to a clockwise direction of rotation occurs when the indexing hub assembly is being lifted. The axes of shafts 408, 372 of the cams 410, 382 are in alignment for the cam contours and rotations just described.

The maximum radial dimension of the program cam 410 is at the hub up point 480, while the minimum radial dimension is at the hub down point 476. Conversely, the minimum radial dimension of the feedback cam is at the hub up point 488, while the maximum radial dimension is at the hub down point 494. The maximum radial dimensions of the two cams are substantially equal, as are the minimum radial dimensions of the two cams.

When in the hub up position the lever ends 438, 440 are touching the maximum radial dimension of the program cam 410 and the minimum radial dimension of the feedback cam 382, respectively. When in the hub down positions the lever ends 438, 440 are touching the minimum radial dimension of the program cam and the maximum radial dimension of the feedback cam. With the equality of radial dimensions set forth above, then, the plunger 424 of the servo valve 417 would be in the same position whether the cams are in the hub up or hub down position. The only change would be in the position of the differential lever 426, the lever being rotated on its pivot counterclockwise in the hub up position and clockwise in the hub down position. The rotation of the program cam 410, however, leads the rotation of the feedback cam 382 causing the desired control operation of the transfer device 50, as described below.

Assume that the transfer device 50 is in phase with the molding machine 350 and that the cams 410, 382 are in their hub up positions with points 480, 488 touching the ends 438, 440 of the differential lever 426, and that the limit switches of the electrical control circuit indicate that the two machines are in phase. A signal is produced by the selsyn generator 390 in response to rotational movement translated to generator 394 by the mold control timing device 394. The signal from the generator 390 is received by the selsyn slave motor 400 causing counterclockwise rotation of the program cam 410. Since the radial dimension of cam 410 is now decreasing, the cam track 484 moves away from the end 438 of lever 426. When the lever end 438 follows the diminishing radial dimension, the plunger 424 of the servo valve 417 is permitted to move to the right in FIG. 11, since there has as yet been no corresponding movement of the feedback cam 382. Thus there has been no corresponding movement of the end 440 of the lever 426 and the end 440 is still at the maximum radial dimension of the feedback cam 382.

The movement of the plunger 424 to the right provides a signal to the servo valve 417 causing movement of the spool 472 in valve 417 to direct pressure from the conduit 418 through one of the conduits 412, 414 to cause the fluid motor 92 to rotate in a clockwise direction (as viewed in FIG. 1) to lower the indexing hub assembly. The servo valve 417 also then connects the other of the conduits 412, 414 to the fluid return conduit 420.

When the indexing hub assembly 80 responds by moving vertically downward, the feedback cam 382 is rotated in a counterclockwise direction (as viewed in FIG. 14), thereby increasing the radial dimension of the cam 382 to neutralize the reduction of the radial dimension of cam 410 and try to return the plunger 424 to its original position and the valve spool 472 to its null or center position to cut off flow of fluid to the motor 92.

In actual practice, of course, the program cam 410 continues to rotate providing a continuous input of program signals to the servo valve 417 and a continuous provision of feedback signals in response to movement of the indexing hub assembly 80, to maintain the transfer device 50 in proper phase with the molding or article producing machine 350.

Referring now to FIG. 16 there is illustrated the electrical control diagram for the transfer device 50. It will be noted in the circuit diagram of FIG. 16 that a numbered line diagram has been utilized. The components can thus be readily located by reference to the line number where the component is positioned. Further, contact switching operations may be noted without designating a mechanical tie between the contacts and the actuating means. Thus, the contacts may be located at any convenient position, even though quite remote from their actuating means.

Cross reference between the actuating means and its associated contacts is easily accomplished by noting in the right hand margin of the drawings the reference character of the actuating means. For example, the reference character CR1 is located in the margin adjacent line 37, the line in which the contact actuating relay coil CR1 is located for energization. Following the reference character CR1 the line number in which the CR1 contacts appear are noted, i.e., 36, 36. A double notation is used here since two CR1 contacts appear in line 36.

A contact line number notation that is not underlined indicates that those contacts are normally open, as in line 36. A contact line number notation that is underlined indicates that those contacts are normally closed, i.e., as at line 44 wherein the CR4 contacts of the relay coil CR4 located in line 40 are underlined to note that the CR4 contacts in line 40 are normally closed. Other actuating means and their associated contacts are similarly noted.

The motor MTR1 for driving the pump 448 of the hydraulic control system is located in line 31 and receives power from a power source PS1 via leads L1, L2, and L3 when the motor actuating contacts M1 in lines 30, 31, and 32 are closed. Power is supplied to a control circuit in lines 33 to 46 from the power source PS1 via the leads L4 and L5.

A limit switch contact LS1 is shown in line 37 and is a two position limit switch which is either contacting lead L6 or lead L7 in response to the detection of the actual position of the indexing hub assembly 80. A limit switch device LS1 is schematically noted as located adjacent the travel of the indexing hub assembly 80 in FIG. 10.

A limit switch contact LS2 is also shown in line 37 and is also a two position switch contact, being either in contact with the lead L6 or the lead L7. A limit switch device LS2 is schematically shown in FIG. 10 adjacent the program cam 410 and is responsive to the position of the program cam. The position of the limit switch contacts LS2 in line 37 is reversed when the program cam 410 calls for either an extreme up or an extreme down position. The limit switches LS1 and LS2 are shown both connected to lead L6 as they would be after the hub has been to the top and the program input cam has passed the top signal position. Thus, the limit switches LS1 and LS2 cooperate to close circuits for starting when they agree on the direction of motion for the hub to prevent starting with automatic control in the wrong direction. That is, in order to form a series connection in line 37 to enable starting of the transfer device 50 in the automatic mode of operation, the limit switch contacts LS1 and LS2 must either be both connected to lead L6 or both be connected to lead L7.

The limit switch contacts LS3 and LS4 in line 37 of FIG. 16 are actuated by limit switch devices LS3, LS4 schematically illustrated in FIGS. 10 and 11 to sense an extreme imbalance of a signal applied to the servo valve 417, as when the hub position indicated by the feedbacl cam differs from the input signal indicated or provided by the program cam. Thus if the plunger 424 in FIG. 11 is at an extreme left position, the limit switch contacts LS3 will be opened. Similarly, if the plunger 424 is at an extreme right position in FIG. 11 the limit switch contacts LS4 will be opened. This breaks the series circuit in line 37 of FIG. 16 and prevents starting in the automatic mode of operation when the indexing hub assembly 80 is far out of phase with the input signal provided by the program cam 410.

In summary, since the feeder timing means 394 in FIG. 11 normally operates continuously, the transfer device 50 must be started in phase with it. Otherwise, the transfer device could start up with a full signal up or down to catch up to the feeder position and the workpiece pickup heads 208, 214 may collide with the molds or the mold indexing table in the process.

To insure that the transfer device 50 starts in phase two conditions must be met. First, the hub assembly 80 must be in position to agree with the input phase signal from the generator 390 and, second, the direction of motion (up or down) must agree with the direction of the last motion made by the hub assembly 80 in order that the clutch be shifted correctly for proper cam rotation.

The first condition is provided by the limit switches LS3 and LS4. They are operated by the servo valve operating plunger 424 to remain open when there is a large signal imbalance applied to the valve 417. The second condition is provided by the limit switch contacts LS1 and LS2. The limit switch contact LS2 has its position reversed by the program cam 410 when the "program" calls for extreme up or down positions. The limit switch LS1 is in series with the limit switch contact LS2 and is also reversed but at the "actual" extreme up and down positions of the indexing hub assembly 80. Thus the limit switch contacts LS1 and LS2 have to agree in polarity, or both be connected to either lead L6 or lead L7, in FIG. 16 before enabling the connection of starting power therethrough.

A limit switch LS5 is illustrated schematically in FIG. 10 adjacent the arms on the indexing hub assembly 80 and provides a signal indicating the position of the arms 200, 202 via two limit switch contacts, LS5a in line 42 and LS5b in line 41 of FIG. 16. The limit switch contact LS5a is closed and the limit switch contact LS5b is open when the arms 200, 202 are within a predetermined distance of the mold, for example 12 inches. When the arms 200, 202 are more than 12 inches above the mold, the limit switch contact LS5a is open and the limit switch contact LS5b is closed. The limit switch contacts LS5a and LS5b are shown in FIG. 16 in the position they would be when the indexing hub assembly 80 is at the preferred starting position with the indexing hub assembly all the way up.

When the limit switch contacts LS5b are closed, the solenoid SOLC in line 40 is energized to open valve 416 to enable continued automatic operation. When the limit switch contacts LS5a are closed, the relay CR3 in line 42 is energized. Contacts CR3 between the mold table index control unit 354 and the indexing mechanism of mold table 352 open to prevent or inhibit indexing of the mold table.

A limit switch mechanism LS6 is shown illustrated schematically in FIG. 10 and actuates limit switch contacts LS6 in line 44 of FIG. 16 in response to the position of the mold indexing table 352. When the mold table 352 is stopped and the limit switch means LS6 in FIG. 10 is at a detent position, the limit switch contacts LS6 in line 44 are open. When the mold index table 352 is indexing or moving the molds to their next station the limit switch LS6 contacts in line 44 are closed, enabling energization of solenoid SOLC and opening of the automatic operation vlave 416. The signal from the limit switch device LS6 is directed to both the transfer device control 353 and the mold table index control 354 in FIG. 10, since a signal indicating the actual position of the mold table 352 is useful in both control units.

In summary, the limit switch LS5 identifies the hub position below which the casting machine would interfere if it has not completed an index movement. When the casting machine has completed an index movement, the limit switch LS6 closes contacts to operate relay CR4 which closes contacts CR4 in line 40 around the LS5b contacts to keep the transfer device operating. Otherwise the LS5b contacts open below the critical hub position and stop the transfer device if the casting machine has not indexed into position. Similarly, contact LS5a is closed to operate relay CR3 and open contacts CR3 in FIG. 10 to prevent an indexing movement by the casting machine when the hub is in an article-pickup position.

In operation, the type of operation desired is selected by the switch SW1 having contact closure points in lines 35, 37, 39, 40. When the SW1 contacts are moved to the contact positions in lines 35, 39, a manual operation may be initiated. A push button PB2 has contacts in line 35 and in line 37. When the switch SW1 has been moved to the manual operation position, closure of the push button contacts PB2 in line 35 connects power through a stop-operation push button PB1 back contacts in line 34, through SW1 contacts and PB2 contacts in line 35 to a motor start relay M1 in line 34. Energization of the motor start relay M1 closes M1 contacts in line 34 to connect a holding circuit around the start push button PB2 in line 35, closes M1 contacts in line 39 to energize the second section of the manual-automatic operation switch SW2, and closes M1 contacts in lines 30, 31 and 32 to energize the pump motor MTR1.

Since the M1 contacts in line 39 and the SW1 contacts in line 31 have been closed to the manual position, power is supplied to a manual operation or jog switch SW2 having contact closure positions in lines 45 and lines 46. By closing switch SW2 to line 45 the solenoid SOLB is energized causing operation of the valve 458 in FIG. 12 to move the indexing hub upwardly. Similarly, closure of switch contacts SW2 to the contact closed position in line 46 will energize solenoid SOLA which will operate manual operation of valve 458 in FIG. 12 to move the indexing hub assembly down.

The holding circuit of the motor start relay M1 through the closed M1 contacts in line 34 may be interrupted by operating or pushing the stop push botton PB1 in line 34 to remove energization power from the relay M1 and open holding contacts M1 in line 34.

For automatic operation the switch SW1 may be moved to the contact closed position in lines 37 and 40. When the conditions sensed by the limit switch contacts LS1, LS2, LS3 and LS4 in line 37 occur so that the series circuit is completed in line 37, a "ready" pilot lamp R in line 38 is illuminated indicating that the transfer device 50 is in phase with the casting machine and may be started. If the push button PB2 is closed to its start position contact closure in line 37, the automatic start relay CR1 is energized. Contacts CR1 in line 36 and to the right of FIG. 16 then close to supply energizing power to the motor start relay M1 with the resulting contact closures hereinbefore noted. The holding circuit M1 contact in line 34, through the now closed CR1 contacts to the left in line 36, is connected back to the automatic switching contacts SW1 in line 37 to hold the motor operating relay M1 energized, even though the start push button PB2 is released.

The closure of SW1 contacts in line 40 also enables connection of energizing power to the solenoid SOLC in line 40 for opening the valve 416 in FIG. 12 to enable automatic operation of the transfer device. If the limit switch device LS6 on table 352 is not in the detent position shown in FIG. 16 and limit switch contacts LS6 therefore closed in line 44, the relay CR4 is energized and the CR4 back contacts are opened in line 40 to open one of the parallel paths of energization for the solenoid SOLC. If the LS5*b* contacts in line 41 are also open, the other of the parallel paths of energization for the solenoid SOLC is also open and the actuation of the automatic operation valve 416 is prevented. Therefore, either the mold index table must have completed its index cycle, or the arms 200, 202 must be more than the predetermined distance away from the mold index table to enable initiation and continuing operation of the transfer apparatus 50 in the automatic mode.

If the limit switch contacts LS5*a* are closed in line 42, the relay CR3 is energized opening CR3 contacts in FIG. 10 to prevent any indexing movement by the mold table index control 354.

Referring now to FIGS. 17 through 24 there is illustrated generally at 500 the pickup arm, rotating post arm, and the vacuum pickup assemblies. These assemblies are connected in front of the indexing hub assembly 80 as viewed in FIG. 1, attached to the front of the forward housing section 232 and attached to or surrounding the axle 238 of the indexing hub 130.

A cam mounting plate 502 (shown also in FIG. 7) is secured to the front of the forward housing section 232 by bolts. A post rotating cam 504 (best seen in the plan view of FIG. 17 and shown alone in FIGS. 21 and 22) is attached to the cam mounting plate 502 by bolts 506 extending through horizontal slots 508 formed in the circular back plate 510 of the cam 504 and into interiorly threaded bolt holes 512 in the cam mounting plate.

A horizontally elongated or oval-shaped opening 514 (see FIG. 21) is formed through the back plate 510 of cam 504 to enable the cam to fit over and around the axle 238 of the indexing hub 130. The left side of the hub opening 514 and the left sides of slots 508 are located in the back plate 512 so that when the left sides of the hub opening 514 and slots 508 are positioned adjacent axle 238 and bolts 506, the annular cam track 516 formed by the outer peripheral surface of the cylindrical portion 518 extending forwardly from back plate 510, will be concentric with the axle 238 of the indexing hub 130.

Internally threaded horizontal set screw holes 520 are formed to the right of the upper and lower slots 508 and to the left of middle slot 508 (see FIGS. 21 and 22) enabling the use of set screws to bear against bolts 506, to hold the cam 504 in a desired position. The set screws also provide a means for accurately horizontally moving or adjusting the position of the cam 504 with respect to the indexing hub 130.

Figure 17:
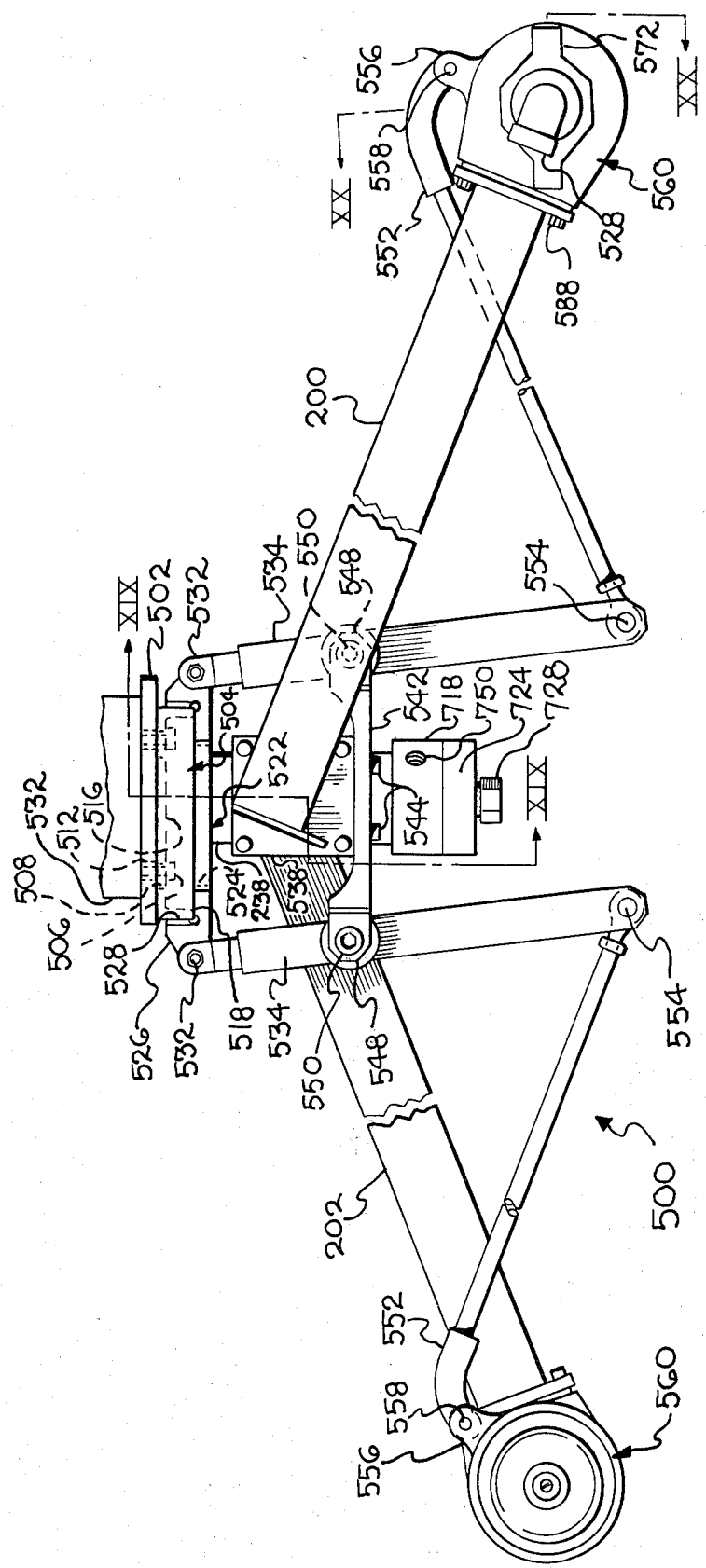
FIG. 17 is a plan view of the pickup arm and post rotating assembly of the transfer device.
Figure 23:
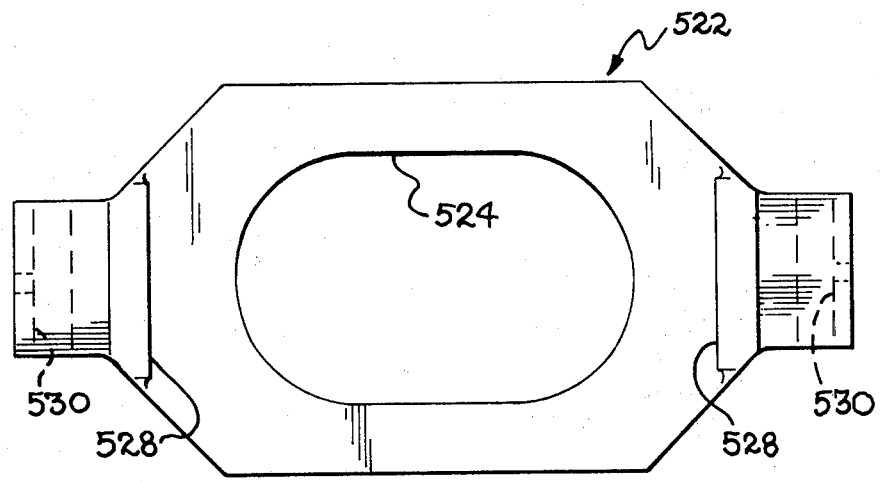
FIG. 23 is a rear elevational view of the post rotating yoke element.
Figure 24:
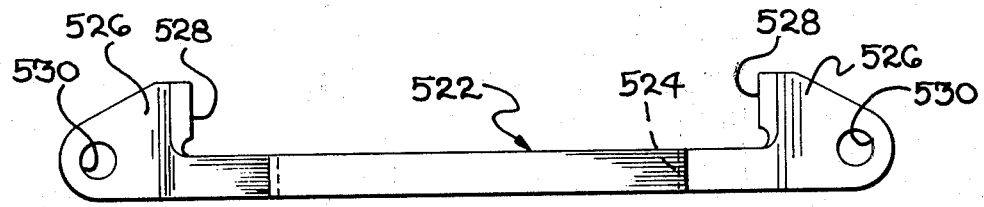
FIG. 24 is a plan view of the post rotating yoke of FIG. 23.

A post rotating yoke 522, shown from above in FIGS. 17 and 24 and in a rear elevational view in FIG. 23, has a horizontally elongated opening 524 formed therethrough enabling the yoke 522 to fit over the axle 238 of the indexing hub 130. The oval-shaped opening 524 must be longer than the corresponding opening 514 of the cam 504, since the cam may be taken off from the cam mounting plate and rotated 180 degrees from the position shown in FIG. 21 and then reassembled, thereby enabling the cam 504 to also be offset from the center of the indexing hub 130 to the right. Thus, the oval opening 524 of the yoke 522 must be able to accommodate left and right cam offset and be able to reciprocate through the distance of the offset to either side of the hub as will be explained hereinafter.

As best seen in FIG. 24, the yoke 522 has a pair of diametrically opposed rearwardly extending flanges 526 having facing cam bearing surfaces 528 formed on the inner sides of the flanges 526 which ride on the outer annular cam track 516 of the cam 504. The flanges 526 each have bores 530 formed vertically therethrough for pivotally connecting at 532 in FIG. 17 the rear ends of lever arms 534 to the flanges 526 of the yoke 522.

Figure 18:
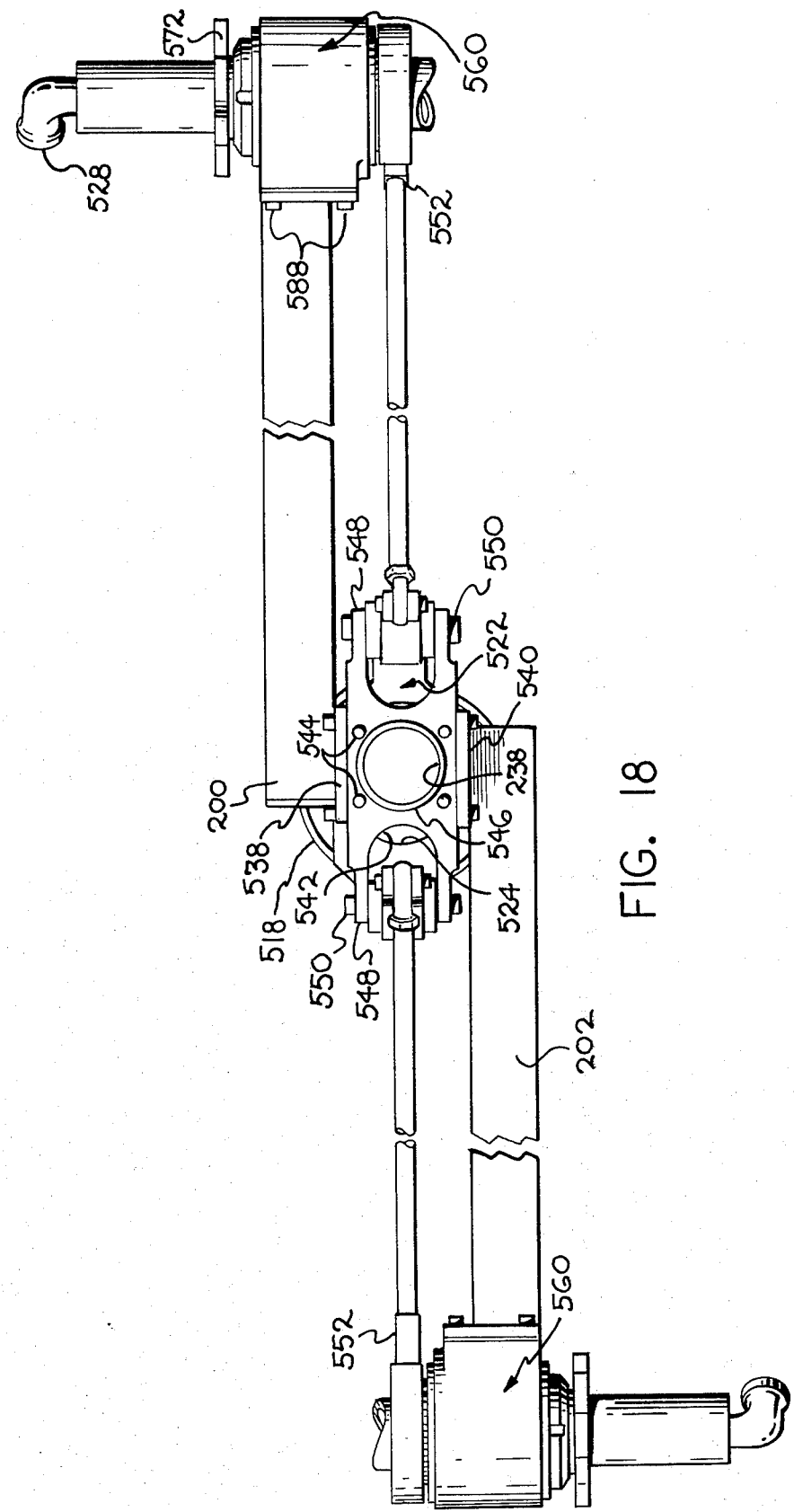
FIG. 18 is a front elevational view of the pickup arm and post rotating assembly.
Figure 19:
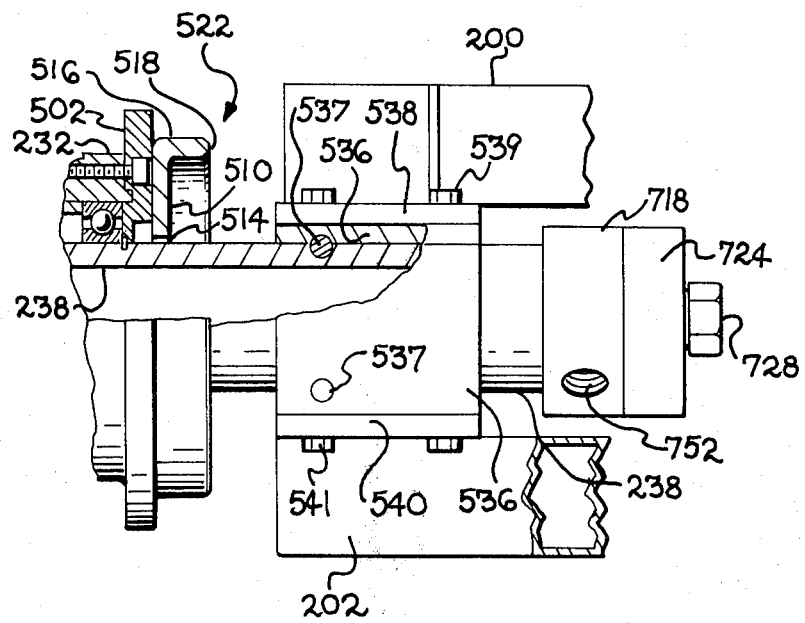
FIG. 19 is a sectional view illustrating the connection of the pickup arms to the indexing hub assembly and taken along lines XIX—XIX of FIG. 17.

A pickup arm attachment block 536 (see FIG. 19) is spaced forwardly from the cam 504, enabling free rotation of the yoke between the cam and the block 536, and is secured to the axle 238 by taper pins 537. The yoke and lever arms 534 have been omitted in FIG. 19 for purposes of clarity. The pickup arm 200 is secured to the top of the arm attachment block 536 by an attaching plate 538 and bolts 539, while the pickup arm 202 is shown secured to the bottom of the block 536 by an attaching plate and balls 541 (FIGS. 18 and 19). The block 536 and the arms 200, 202 are thus secured to the axle 238 of the indexing hub 130 for rotation therewith.

A clevis bar lever support 542 is secured to the arm attachment block 536 by bolts 544 (see FIGS. 17 and 18), a central aperture 546 (see FIG. 18) in the bar 542 enabling the bar to slip over the axle 238 of the hub 130 and abut against the block 536. As also best seen in FIG. 18, each of the ends 548 of the bar 542 have a clevis formed therein to receive and pivotally support lever arms 534 on pivot pins 550. The clevis bar lever support 542 has also been omitted from FIG. 19 for the purposes of clarity, while the valve bodies 718, 724 shown in FIG. 17 have been omitted in FIG. 18 for the purposes of clarity.

Each of the front ends of the lever arms 534 have a clevis formed therein to pivotally receive an inner end of a connecting line 552 on pivot pins 554. The outer ends of links 552 are pivotally connected to bell crank arms 556 by pivot pins 558 to rotating post assemblies 560. As noted hereinbefore the rear ends of lever arms 532 have a clevis structure which is pivotally connected at 532 to the flanges 526 of the yoke 522.

It can thus be seen that if the peripheral cam track 516 is centered with respect to or concentric with the axle 238 of the indexing hub 130, that the inwardly facing bearing surfaces 528 of the yoke 522 will travel in a circular path also concentric with hub 130 as will the rear ends of the lever arms 534, when the indexing hub 130 is rotated with respect to the stationary cam 504. The distance between the pivot pins 550 for the clevis bar support and the distance between the pivotal supports 532 of the rear end of the lever arms 534 is the same. Thus, with a circular cam path the front ends of the lever arms 534 will also stay the same distance apart. Since the cam 504 is centered there is no movement imparted inwardly toward or outwardly away from the hub 130 to either the rear or the front ends of the lever arms 534 and no motion is transmitted through the links 552 to the bell crank arms 556 of the rotating post assemblies 560.

Let us now assume that the center of the cam 504 is offset from the center of the indexing hub 130, for example, to the left as shown in FIGS. 17 and 18. The inwardly facing bearing surfaces 528 of the yoke 522 and thus the rear ends of lever arms 534 are moved to the left, rotating the lever arms 534 counterclockwise on pivot pins 550 as viewed in FIG. 17. The front ends of arms 534 are also rotated counterclockwise to the right as viewed in FIG. 17. This pushes the right link 552 to the right and rotates the right bell crank arm 556 counterclockwise as viewed from the article pickup head depending down from arm 200. Similarly, the left link 552, in FIG. 17, is pulled to the right, rotating the left bell crank arm clockwise as viewed from the article pickup head extending upwardly from arm 202.

This will provide a predetermined first orientation of a workpiece pickup head on the right rotating post assembly 560 with respect to a mold and/or a workpiece in the mold space vertically therebelow, assuming that the transfer device is at its preferred starting position with the indexing hub assembly 80 at the top of its vertical travel.

This first orientation will be that defined by the position of the front end of the right lever arm 534 with respect to a line through the center of the right pivot pin 550 which is parallel to the axis of the indexing hub 130. In FIG. 17, the front end of the right lever arm 534 is on the outside of the right pivot pin center line with respect to the indexing hub 130. Therefore, the first orientation of the right rotating post assembly is a rotation counterclockwise of the workpiece pickup head away from the indexing hub 130 an amount proportional to the displacement of the front end of the right lever 534 outside of the right pivot pin centerline.

The cam offset shown in FIG. 17 will also provide a predetermined second orientation of a workpiece pickup head on the left rotating post assembly 560, and of a workpiece carried on or grapsed by the pickup head. The second orientation will be that defined by the position of the front end of the left lever arm 534 with respect to a line through the center of the left pivot pin 550 which is parallel to the axis of the indexing hub 130. In FIG. 17, the front end of the left lever arm 534 is on the inside of the left pivot pin centerline with respect to the indexing hub 130. Therefore, the second orientation of the left rotating post assembly 560 is a rotation clockwise of the workpiece pickup head toward the indexing hub 130 an amount proportional to the displacement of the front end of the left lever 534 inside of the left pivot pin centerline.

Assuming that the indexing hub assembly 80 is at the top of its vertical travel, the next movement in the cycle of the transfer device 50 for the indexing hub assembly 80 is the vertical descent with the arms 200, 202 remaining horizontally stationary as shown in FIG. 17, stripping the workpiece from the left pickup head onto the conveyor means 216 with the workpiece in the second orientation position, and inserting the right pickup head into a workpiece in a mold in the first orientation position.

As the next cycle of the transfer device 50 begins, the indexing hub assembly 80 will ascend vertically, the indexing hub 130 will rotate 180° reversing the positions of the arms 200, 202 from that shown in FIG. 17. Because the cam 504 is displaced to the left, the cooperating cam track 516-yoke 522 will move the front end of the lever arm associated with the pickup arm 200 inwardly and will move the front end of the lever arm associated with the pickup arm 202 outwardly. This will rotate the workpiece pickup head on the rotating post assembly of the pickup arm 200 toward the index hub 130 to the second orientation position, and will rotate the workpiece pickup head on the rotating post assembly of the pickup arm 202 away from the indexing hub 130 to the first orientation position.

Thus a workpiece picked up by the arm 200 will not only be inverted, but will be rotated on its vertical axis to a new orientation. The amount and direction of orientation change of the workpiece will depend upon the amount and direction of displacement of the cam 504 from the center of indexing hub 130, on the relative lengths of linkage components between the cam track 516 and the center of a rotating post assembly, and on the positioning of the pivotable supports on the linking components. Orientation changes of workpieces of 70° in each direction have been effected experimentally without difficulty, permitting a choice of orientation anywhere within a range of 140°.

Figure 20:
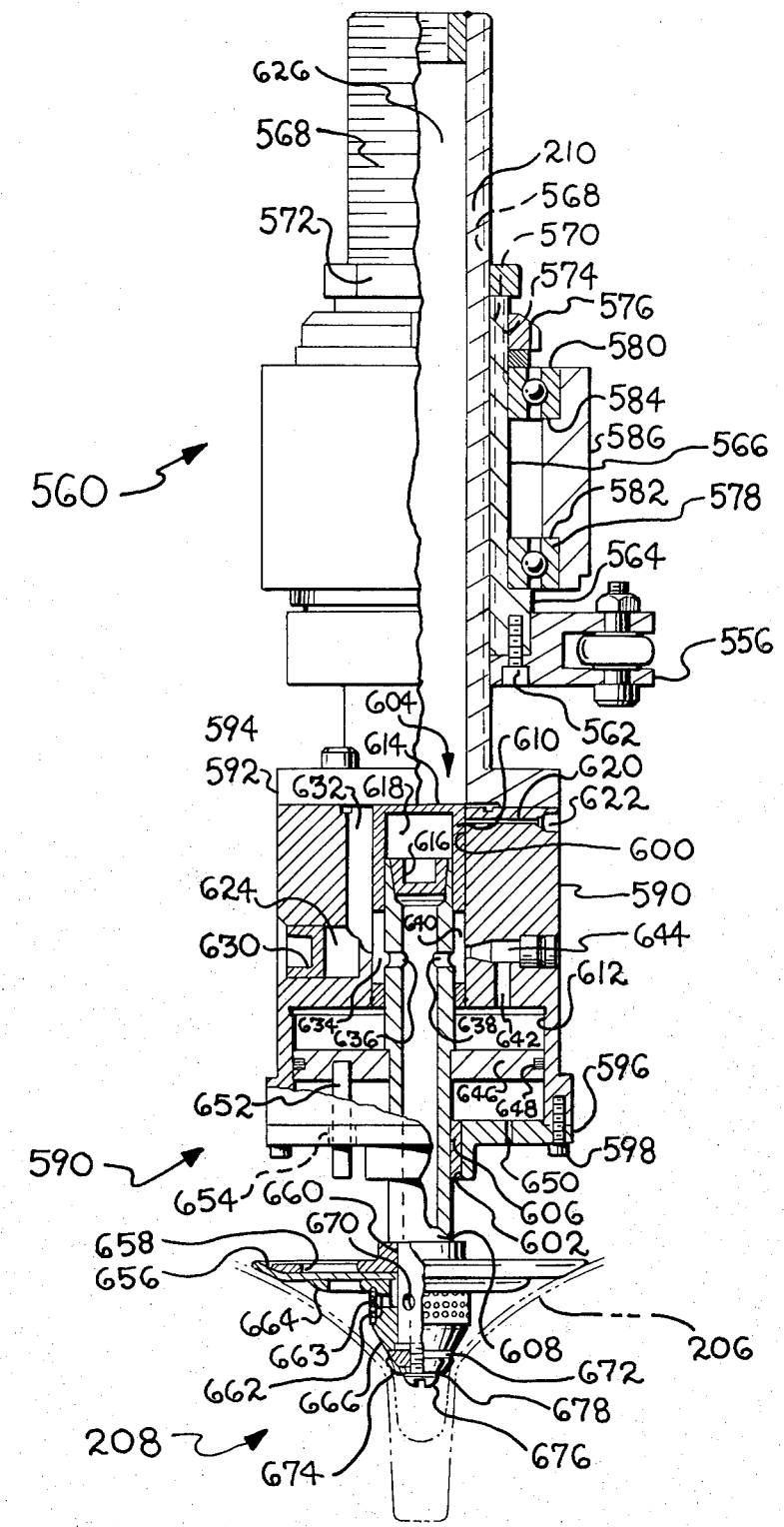
FIG. 20 is a sectional view of the pickup arm and pickup head assembly of the rotating post assembly taken along lines XX—XX of FIG. 17.
Figures 21, 22:
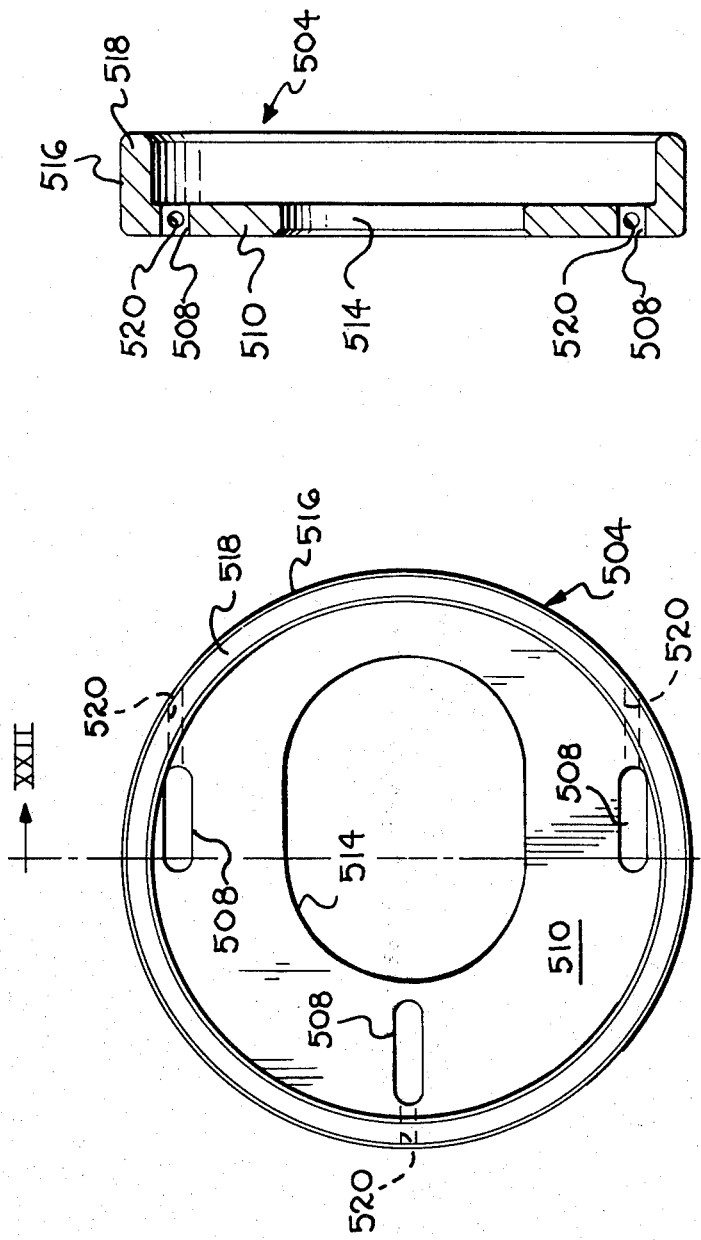
FIG. 21 is a front elevational view of a pickup arm post rotating cam.
FIG. 22 is a cross-sectional view of the post rotating cam taken along lines XXII—XXII of FIG. 21.

Referring now to FIG. 20 there is shown a crosssectional view of the rotating post assembly 560 taken along lines XX—XX of FIG. 17. The bell crank arm 556 is secured by bolts 562 to an outwardly extending flange 564 on the bottom of a holding sleeve or bearing collar 566 for the downwardly depending arm or post 210. The post 210 has external screw threads 568 formed thereon, while the sleeve 566 has mating internal screw threads 570 formed on the interior thereof. The post 210 is screwed into sleeve 566 until the pickup head assembly 208 is placed in the desired position with respect to a mold or workpiece. A wing nut 572 is screwed down on the upper end of the post 210 against the upper end of sleeve 566 to lock the post at the selected height.

The sleeve 566 has exterior screw threads 574 formed on the outer upper end thereof so that when a lock nut arrangement 576 is screwed down on the threads 574 the sleeve 566 is held in place with the outwardly extending flange 564 abutting against the inner race of a lower bearing 578 and the lock nut arrangement abutting against the inner race of an upper bearing 580. The outer races of the bearings 578, 580 are received in and held apart by bearing seats 582, 584 formed in the cylindrical interior of a post hub 586 which rotatably supports the sleeve 566 and the post 210.

It can then be seen that rotation of the bell crank arm 556 will rotate the sleeve 566, and thus the post 210 held thereby, on the bearings 578, 580 in the post hub 586. The post hub 586 is secured to the end of pickup arm 200 by bolts 588 (FIG. 17).

A pickup cylinder body 590 is secured to an outwardly extending flange 592 at the bottom of the post 210 by bolts 594. A pickup cylinder end cap 596 is secured to the bottom of the pickup cylinder body 590 by bolts 598. A minor bore 600 is axially formed in the cylinder body 590 and an aligned minor bore 602 is formed axially in the end cap 596. The bores 600, 602 receive and retain piston shaft bushings 604, 606, respectively, to slidably receive a hollow piston shaft 608.

The bushing 602 may be a standard cylindrical type. However, the bushing 604 is advantageously formed with a cylindrical body 610 extending the length of the minor bore 600 in body 590, from a major bore 612 formed in the lower end of the body 590 to the top or post-adjacent end of the body 590. The bushing cylinder portion 610 is open to the major bore 612 to receive the piston shaft 608, but is closed by a transverse wall 614 at the other end. Therefore, when the piston shaft 608 has its upper end closed with a plug 616 and is inserted into bushing 604, a closed chamber 618 is formed in the bushing 604 between the end wall 614 thereof and the plug 616.

The chamber 618 is vented by a transverse bore 620 formed in the cylinder body to enable air to escape from the closed chambers 618 when the plugged piston shaft is pushed into the upper part of the bushing 604. When the piston shaft is at the desired position a screw plug 622 may be used in the vent bore 620. The screw plug 622 preferably has an orificed passage formed therethrough to cushion the cylinder action. The closed chamber 618 may act now as a damping chamber to dampen impact of the pickup head with the workpiece in a mold, and to dampen the contact of the workpiece with the removing conveyor 216 when the workpiece is stripped from the pickup head.

Alternate suction or vacuum connection ports are provided. A first port 624 in the side of the cylinder body 590, and a second port 626 in the upper end of the hollow rotating post 210 are shown. In this instance the port 626 is used with a fitting 628 (FIG. 18) placed therein to be coupled to a vacuum source. A plug 630 is then placed in the port 624. A bore 632 is formed in the cylinder body 590 in an axial direction along the outside of the bushing wall 610 of the bushing 604 and provides communication between both of the ports 624, 626 and a first small plenum 634 formed in the wall 610 of bushing 604.

The piston shaft 608 has a pair of diametrically opposed apertures 636, 638 formed through the wall of a shaft 608. When the shaft 608 is positioned as shown in FIG. 20, the aperture 636 provides communication between the interior of the hollow shaft and a first small plenum 634, while the second aperture 638 provides communication between the interior of the shaft and a second small plenum 640 formed in the wall of the bushing 604.

Communication between the second small plenum 640 and the major plenum formed by the bore 612 via a conduit 642 is controlled by a needle valve arrangement 644. A piston head 646 is mounted on the shaft 608 and is reciprocably slidable in the major plenum 612, with sealing rings 648 around the periphery of piston head 646 preventing communication between opposite sides of the piston head in the major bore. A vent 650 in the end cap 596 opens the pickup head side of the piston head 646 to the atmosphere. One or more guide rods 652 may be attached to the lower side of the piston head 646 and extend through guide apertures 654 in the end cap 596 to maintain the shaft apertures 636, 638 in alignment with the first and second small plenums 634, 640, and to maintain piston, vacuum head and article orientation.

The pickup head assembly 208 includes an upper suction disc 656 adhesively or otherwise secured to a backup plate 658 slidably received on a reduced diameter end portion 660 of the shaft 608. A filter screen 662 is held away from the shaft portion 660 and between an upper screen support 664 and a lower screen support 666 slidably mounted on the shaft portion 660. The filter plenum 668 thus formed by the screen 662 communicates with the interior of the hollow piston shaft via one or more apertures 670 formed in the wall of the reduced diameter portion 660 of the shaft 608.

A nose piece 672 is formed in the shape of a truncated cone and has a lower, smaller, suction disc 674 overlying the smaller lower portion thereof to establish contact with a smaller circumference of the workpiece 206, in this instance a television picture tube funnel component. A lock screw 676 extends through a washer 678 supporting the lower suction disc 674 and through central apertures in the suction disc 674 and the nose piece 672, and is engaged or locked on the inside of the reduced portion 660 of the shaft 608 by screw threads or other suitable means. The lock screw 676 thus retains the pickup head assembly 208 on the reduced shaft portion 660.

The spaced upper and lower suction discs are made from a resilient material which is capable of establishing a seal, in response to a vacuum formed therebetween, with the walls of the workpiece extending between the outer peripheries of the two discs. Since the workpiece in this instance has a sealed neck or nubbin, only the upper disc would be required for establishing a pickup vacuum with a good piece of ware. However, the provision of the lower suction disc enables establishment of a pickup vacuum with the walls of the ware even if the neck or nubbin is cracked or broken. Since the workpiece being dealt with in the disclosed embodiment of the invention is glass at a relatively high temperature, the upper and lower suction discs are preferably manufactured from a silicone impregnated asbestos cloth.

In operation when the pickup cylinder assembly is inverted at the top of the vertical travel of the indexing hub assembly 80 so that the pickup cylinder body is pointing down, the amount of air pressure in the damping chamber 618 has been adjusted via the vent bore 620 and the vent plug 622 so that the suction head assembly 208 and thus the piston shaft 608 and piston head 646 may be pulled all the way to the bottom limit of their travel by gravity. The piston shaft apertures 636, 638 are positioned in the shaft 608 so that when the piston head 646 is at the bottom of its travel, the piston shaft apertures 636, 638 are below the plenums 634, 640. Therefore, a vacuum in the bore 632 is disconnected from the interior of the shaft 608 and thus from the suction head 208. This prevents the overworking of a vacuum source that might occur if the vacuum source were connected to the atmosphere for an extended period while the indexing hub assembly descends to the pickup position.

Each mold of the molding machine may be provided with an ejector mechanism which, as is well known to those skilled in the art, raises the workpiece out of the mold for a short distance when the mold arrives at a take-out station. If the equipment is provided with an ejector mechanism then the height of the rotating post 210 at the pickup position may be adjusted so that the suction head assembly 208 will make contact with the workpiece as lifted by the ejector mechanism at a point which will also cause a lifting of the piston shaft 608 with respect to the piston cylinder body.

If the equipment is not provided with an ejector mechanism, then the post height is adjusted so that as the indexing hub assembly comes into the lower pickup position, the suction head assembly 208 will contact the workpiece causing the piston shaft 608 to rise or be lifted relative to the pickup cylinder.

As the shaft 608 rises, the shaft port 636 will be aligned first with the plenum 634, enabling an establishment of a vacuum connection through the interior of the shaft 608, the lower shaft apertures 670, the filter screen 662 to the walls of the workpiece between the suction discs 656, 674. The workpiece is then graspled by the suction head assembly 208.

The plenum 634 extends below the plenum 640, so that the shaft aperture 636 is connected to the plenum 634 before the shaft aperture 638 is connected to the plenum 640. Therefore, the suction grasp on the workpiece is established before the vacuum source is connected to plenum 640 via the shaft aperture 638.

As the shaft 608 continues to rise relative to the pickup cylinder in response to ejector mechanism action, downward travel of the pickup cylinder and/or to the vacuum attraction on the shaft 608, the shaft aperture 638 will become aligned with the plenum 640 connecting the vacuum source through the conduit 642 to the major bore 612. The connection of a vacuum source to the bore 612 will permit the atmospheric pressure entering the bore 612 through the vent 650 to push the piston head 646 up at a rate which exceeds the already established upward relative travel rate of a shaft 608. In response to the increased travel rate provided by pressure on the lower face of the piston head 646, the shaft 608 and the suction head assembly 208 will lift the workpiece clear of the ejector mechanism and/or the sides of the mold. The needle valve arrangement 644 may be adjusted to regulate the rate of lift by the piston head 646.

As noted hereinbefore, the damping chamber 618 is effective during the workpiece contact and pickup action just described to cushion any impact or shock occurring during pickup. Similarly, when the pickup cylinder is inverted, the shaft 608, the suction head assembly 208, and a workpiece on the suction head assembly are resting on the cushion of compressed air in the damping chamber 618 enabling a smoother transfer of the workpiece from the suction head assembly 208 to the workpiece removing conveyor means 216.

Referring now to FIGS. 25 through 29 there is illustrated a vacuum valve assembly indicated generally at 700 which acts to control the connection of a vacuum source to a suction head assembly 208 to pick up a workpiece, retain the grasp on the workpiece during the lifting and inverting of the workpiece, and to disconnect the vacuum source from the pickup head assembly after the workpiece inversion enables gravity to hold the workpiece in place on the pickup head until it is stripped from the head onto the removal conveyor 216.

The valve assembly 700 is mounted on the indexing hub assembly 80, and has means for connecting a vacuum source thereto supported on and fixed against rotation with respect to the rear housing section 230. A connecting conduit extends through the rear housing section 230 and the indexing hub 130 to a distribution valve assembly at the forward end of the indexing hub. All of the vacuum valve assembly 700 is stationary with respect to the indexing hub assembly 80, except for a rotary section of the distributing valve assembly at the front of the indexing hub 130. The rotary valve section provides connection to and rotates with the pickup heads 208, 214 on the pickup arms 200, 202.

Figure 25:
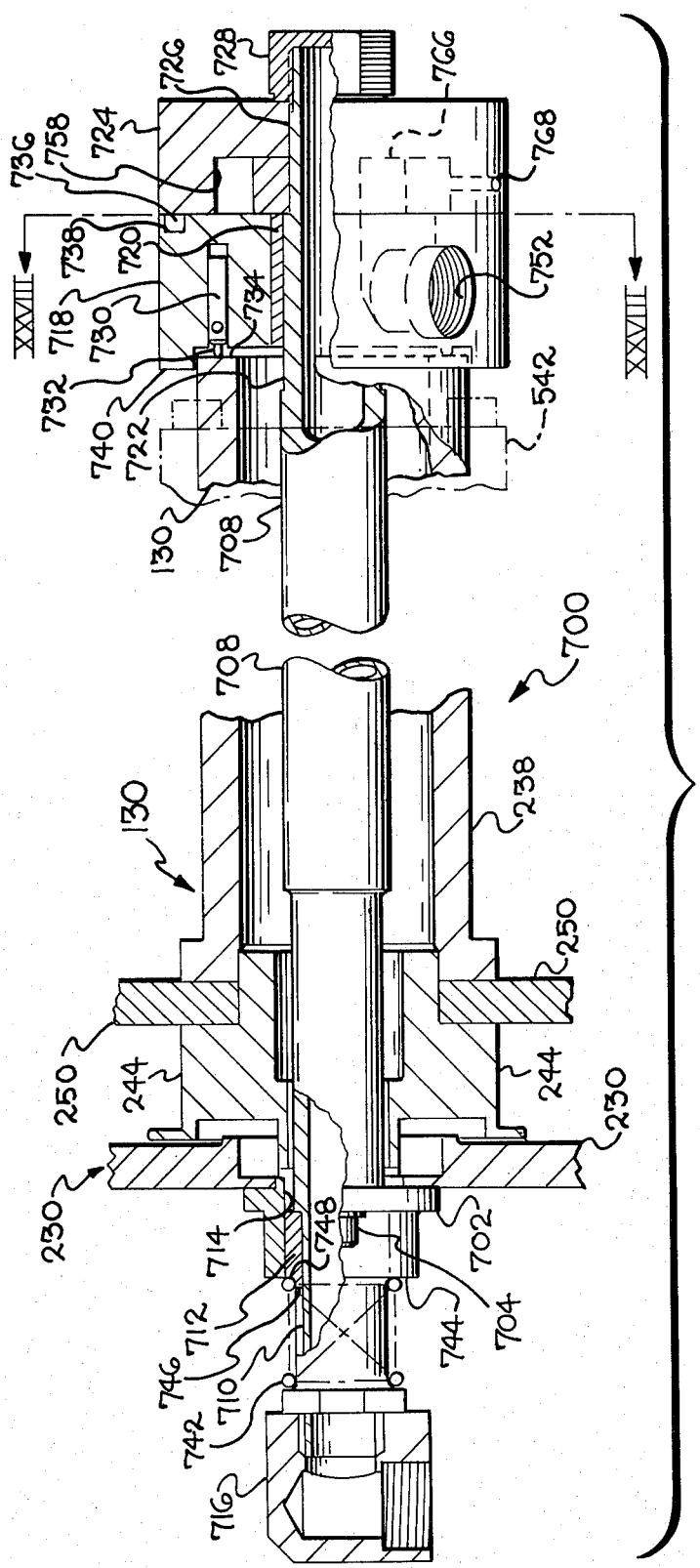
FIG. 25 is a cross-sectional view of a mechanical vacuum valve assembly utilized in this invention.

The pertinent parts of the indexing hub assembly 80 are shown in phantom outline in FIG. 25 to establish their relationship with the vacuum valve assembly 700.

An indicator plate and rear bearing element 702 is attached to the rear housing section 230 by bolts 704 and has a bearing aperture 706 formed therethrough in axial alignment with the center of the indexing hub 130. A conduit 708 is slidably received in the bearing aperture 706 and extends from a position to the rear of and through the bearing elements 702 and indexing hub 130 to a position in front of the hub 130.

A key slot 710 in the conduit 708 receives a key 712. A key slot 714 formed in the bearing aperture 706 of the bearing element 702 also receives the key 712. The key-slot arrangement prevents rotary motion of the conduit 708 but is dimensioned to enable forward and rearward slidable movement of the conduit 708 in the bearing aperture 706.

An elbow fitting 716 is mounted on the rear of the conduit 708 to enable connection of the vacuum valve assembly 700 to a vacuum source (not shown). A distributing valve assembly is mounted on the front end of the conduit 708 and includes a rotary valve body 718 on a bearing 720 on a reduced diameter portion 722 of the conduit 708. The rotary valve body 718 is thus rotatably and slidably mounted on the conduit portion 722.

A stationary valve body 724 is fixed on and keyed to a portion 726 of conduit 708 which has a diameter which is smaller than the conduit portion 722. A cap 728 is screwed onto the front end of the conduit 708 and maintains the stationary valve body 724 against the shoulder between the conduit portions 722, 726.

A plurality of spring assemblies 730 are mounted in the rear face of the rotary valve body 718 and have plungers 732 which bear against the forward end 734 of the indexing hub 130 and yieldingly urge the forward face of the rotary valve body 718 against the rear face of the stationary valve body 724. One or more sealing means 736, illustratively shown as a felt ring received in a seal retaining seat 738 formed in the forward face of the rotary valve body 718, may be used to prevent communication between the atmosphere and the vacuum connecting plenums in the abutting faces of the valve bodies 718, 724.

Alignment of the front end of the conduit 708 in the indexing hub 130 is maintained by a bearing flange 740 which extends rearwardly from the rotary body 718 and rides on the outer surface of the forward end of the indexing hub 130. To maintain the bearing flange 740 on the hub 130 a spring 742 is mounted on the rear of conduit 708 and is compressed between the elbow fitting 716 and a rear face 744 of the rear bearing element 702. It will be noted that the rear portion 746 of the key 712 has been cut down to enable the spring 742 to slide over the key portion 746 and abut against the shoulder 748 on the key 712. Thus the forward end of the spring 742 rides against both the key shoulder 748 and the rear face 744 of the bearing element 702, maintaining a relative alignment therebetween.

Figure 29:
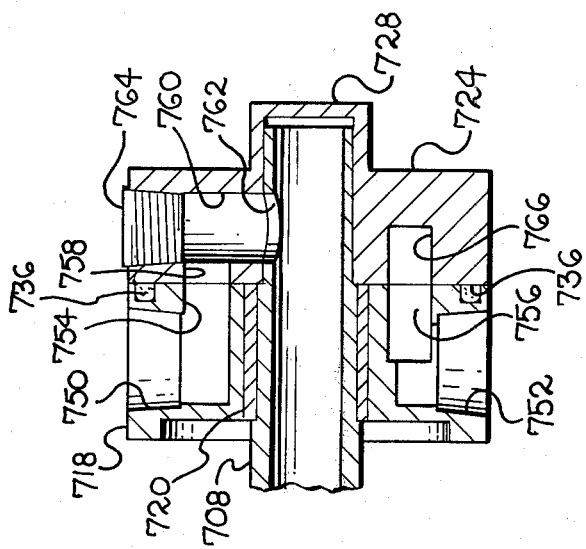
FIG. 29 is a cross-sectional view of the right hand portion of the assembly shown in FIG. 25 and taken along lines XXIX—XXIX of FIG. 26.
Figure 27:
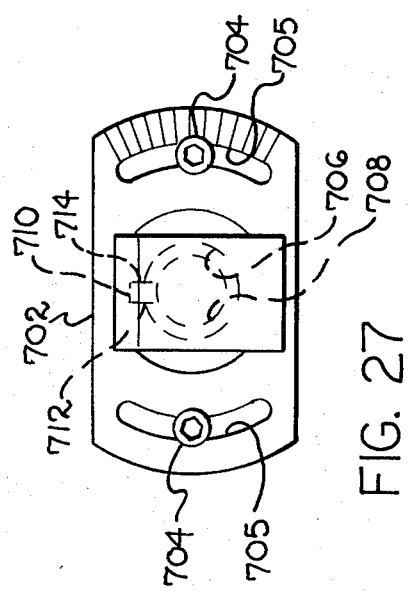
FIG. 27 is an end view of the indicator and rear shaft support of the apparatus illustrated in FIG. 25, taken from the left side thereof.
Figure 28:
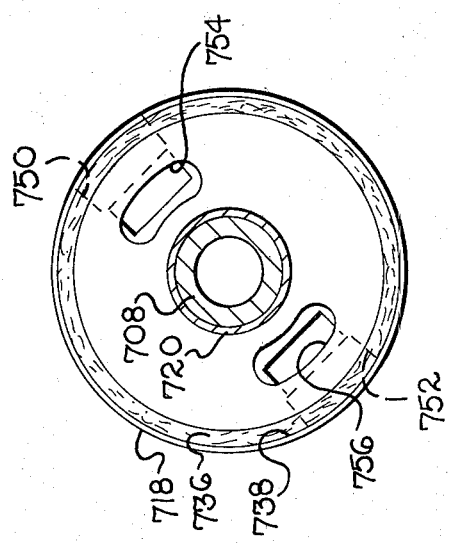
FIG. 28 is a cross-sectional view of the vacuum valve assembly taken along lines XXVIII—XXVIII of FIG. 25.

Referring now to FIGS. 28, 29 and 25, it will be seen that the rotary valve body 718 has diametrically opposed ports 750, 752 for receiving fittings to connect the rotary plenums 754, 756 to the pickup heads 208, 214 on the arms 200, 202 via flexible conduits (not shown) between the ports 750, 752 and fittings as illustrated at 628 in FIG. 18. In order to insure that the rotary valve body 718 stays in phase with and rotates with the indexing hub 130 and thus the arms 200, 202, the front end of the axle of the indexing hub may be provided with forwardly extending bolts or other projections which are engaged by mating holes formed in the rear surface of the valve body 718. All of the views in FIGS. 25 through 29 are shown as they would appear with the arms 200, 202 in their horizontal position.

Figure 26:
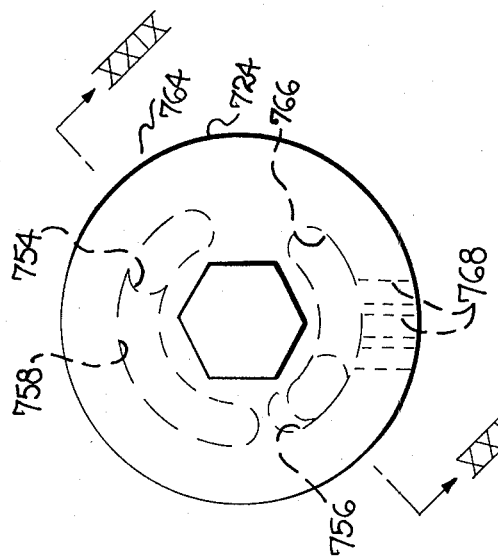
FIG. 26 is an end view of the vacuum valve assembly of FIG. 25 taken from the right side thereof.

Referring now to FIGS. 25, 26 and 29 it will be seen that the stationary valve body 724 has a vacuum plenum 758 formed in the rear face thereof which communicates with the interior of the vacuum conduit 708 via a transverse bore 760 and a conduit aperture 762. A plug 764 closes the bore 760 to the atmosphere. The valve body 724 also has an atmospheric vent plenum 766 formed in the rear face thereof which is connected to the atmosphere via one or more transverse bores 768.

As noted hereinbefore, the arms 200, 202 are in their horizontal position for all of the views in FIGS. 25 through 29. The rotary connecting plenums 754, 756 of the rotary valve body 718 are arcuately shaped when viewed from the front, as in FIGS. 26 and 28, are diametrically opposed, and extend a relatively short distance on each side of the line through the center of the valve assembly which defines an angle of about 45 degrees with respect to a vertical line through the center of the valve assembly.

The vacuum connecting plenum 758 of the stationary valve body 724 is also arcuately shaped, as noted in dotted lines in FIG. 26, and is formed on a radius from the center of the conduit 708 which is equal to that for the rotary plenums 754, 756 enabling alignment thereof when the plenums 754, 756 are rotated past the stationary plenum 758. The plenum 758 is formed in the valve body 724 so that, when the pickup arms 200, 202 are horizontal, the trailing edge of one of the plenums 754, 756 is adjacent the starting edge of the arcuate plenum 758.

The plenum 758 extends arcuately around the stationary valve body 724 so that a vacuum source will be connected to a rotary plenum 754 or 756 for just less than 180 degrees of rotation of the rotary valve body 718. That is, the vacuum source is connected from a stationary valve body 724 through the rotary valve body 718 to positively hold a workpiece on the suction head assembly 208 until the pickup arm 200 has inverted the workpiece so that it will remain on the suction head assembly 208 in response to gravitational forces. The positive grip is released, just before or as the end of the 180 degree rotation is reached, by the rotation of the rotary plenum 754 into alignment with the atmospheric vent plenum 766 arcuately formed in the stationary valve body 724 and aligned with the travel path of the rotary plenums, enabling the stripping of the workpiece from the suction head assembly 208 during the downward travel of the indexing hub assembly 80.

If the exactness of reorientation of the workpiece during its removal from the mold and inversion is critical, then it is desirable to maintain a positive grip on the workpiece for as long as possible during the 180 degrees of rotation, so that a premature release of the vacuum would not permit the reorienting process to be disturbed until completed or at a relatively stable portion thereof, even though gravity would keep the workpiece on the suction head in spite of a premature vacuum release.

The vacuum valve cycle as set forth above is repeated for every 180° rotation of the indexing hub 130. The stationary vacuum plenum 758 is initially connected through one of the rotary plenums 754, 756 to a suction head assembly when it is depending downwardly and at the top of the travel of the indexing hub assembly 80. The other and then upwardly extending suction head assembly is connected to the atmosphere via the stationary plenum 766 just before the 180 degree rotation is completed. These connections are maintained during the downward travel of the indexing hub assembly 80, during the pickup of a workpiece, and during the inversion and reorientation of the workpiece. The connections are then reversed as described hereinbefore and a new vacuum valve cycle starts.

Referring to FIG. 27 there is shown an elevational view of the indicator and bearing support element 702. The bolts 704 connecting the plate and bearing element 702 to the rear housing section 230 extend through arcuate slots 705 formed in the plate 702. Since the conduit 708 is connected to the plate 702 by the key 712, the bolts 704 may be loosened and the plate 705 may be rotated in either a clockwise or counterclockwise direction to change the relative alignment times of the vacuum plenum 758 and the atomspheric plenum 766 with the rotary plenums 754, 756 during the cycle of operation of the valve assembly 700. Rotation of the plate 702 will, through the key 712, also rotate the stationary valve body 724. Thus, a lag or lead in the connection of the vacuum to the suction head assemblies and the connection of the suction head assemblies to atmosphere may be introduced without disturbing any of the other mechanical linkages in the transfer device.

Figure 30:
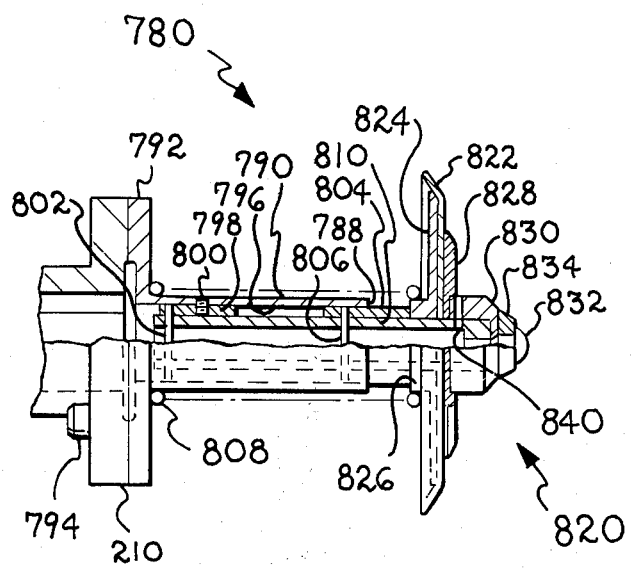
FIG. 30 is a side elevational view, partially in section illustrating an alternative embodiment of vacuum chuck apparatus useful in this invention.

Referring now to FIG. 30, there is designated generally at 780 an alternative embodiment of a vacuum chuck apparatus that may be used at the ends of posts 210, 212 extending from arms 200, 202, to pick up workpieces.

A cylinder 790 has an outwardly extending flange 792 on the end remote from a vacuum pickup head 820. The flange 792 is connected to a flanged rotating post 210 by bolts 794. The cylinder 790 has a bore 796 formed therein which is open to and communicates with the hollow interior of the post 210 which is to be connected to a vacuum source as described hereinbefore.

The bore 796 slidably receives a hollow piston shaft 810. A bushing 798 is fixed in place in the cylinder 790 by a set screw 800 or the like and located near the end of the cylinder which is remote from the vacuum pickup head 820. The end of the shaft 810 remote from the pickup head is slidably received in and extends through the fixed bushing 798. A stop pin 802 extends transversely through the remote end of the shaft 810 and will engage the sides of the fixed bushing 798 to define a first, shaft-extended stop position.

A second movable bushing 804 is fixed on the shaft 810 by a pin 806 or the like. The bushing 804 is slidably received in the bore 796 of the cylinder 790. Since the bushing 804 is between the bushing 800 and the pickup head 820 and the end of thereof is retained within the bore 796 of the cylinder, a quantity of gas or other fluid may be trapped between the two bushings, outside of the shaft 810, and within the bore 790 in the closed chamber defined by these elements. If the gas is under sufficient pressure it will act as an air spring in the closed chamber and yieldingly urge the shaft toward the first stop position extending from the cylinder as shown in FIG. 30.

In addition to, or as an alternative to, the air spring just described, another spring means such as a coil spring 808 may be placed in compression between the pickup head 820 and the flange 792 of the cylinder 790 to yieldingly urge the shaft 810 to the extended, first stop position.

A second stop position may be defined as the fully retracted position of the shaft 810 when the pickup head 820 carried on shaft 810 abuts against the end 788 of the cylinder 790. Thus, the shaft 810 may be telescoped between a retracted second stop position and an extended first stop position. The air spring and/or the coil spring 808 yieldingly urges the shaft 810 toward the extended or first stop position.

The vacuum pickup head 820 includes a suction disc 822 having a centrally located aperture and is adhesively or otherwise secured to a backup plate 824. The plate 824 has a centrally located collar 826 with an aperture formed therethrough so that the collar 826 can be slipped onto the end of the shaft 210 and abutted against the bushing 804 to hold the disc 822 in the position shown in FIG. 30. A retaining plate or disc 828 having a centrally located aperture may also be slipped over the shaft 810 to hold the inner reaches of the suction disc 822 against the backup plate 824.

A spacer 830 is then slipped over the shaft 810 and held against the retainer plate 828 by a lock screw 832 extending through a washer 834 and a central opening of the spacer 830. The lock screw 832 is received and retained in a reduced diameter opening at the end of the shaft 810.

At least one aperture 840 is formed through the wall of the shaft 810 and the spacer 830 to provide communication between the hollow interior of the shaft and the workpiece side of the suction disc 822.

The vacuum pickup head 820 has only one suction disc since it is designed to grasp concave articles having the concavity closed to the ambient atmosphere. Therefore, when the suction disc 822 is seated in the concavity of a workpiece, e.g., a centrifugally cast funnel component of a television picture tube, there is as yet no opening in the small end of the funnel and a closed chamber is formed by the walls of the small end of the funnel and the suction disc 822. The connection of a vacuum source to the post 210 and through the shaft 810 and aperture 840 to the closed chamber will cause the workpiece to be firmly grasped by the pickup head until the vacuum source is disconnected.

Thus, the vacuum chuck illustrated in FIG. 30 is similar to that shown in FIG. 20, in that each has a pickup head mounted on a shaft with a telescoping motion, the shaft and the pickup head being yieldingly biased in an extended position toward a workpiece to enable air, coil or other spring means to act as a shock absorber during head-workpiece contact.

The principles of operation of the overall system of this invention and the various sub-systems of the invention have thus been shown and described in an apparatus for transferring an article from an article pickup station to an article deposit station.

Basically the system includes a carrier housing and means for moving the carrier housing up and down a vertical path. An indexing hub means is journally supported for rotation in the carrier housing.

Article pickup means are provided which include a plurality of arms extending from the hub means and an article grasping means carried on each of the arms. A first one of the arms extends towards and positions the article grasping means carried thereon at a pickup station to enable article grasping when the carrier housing is at one end of the travel path. Means responsive to the travel of the carrier housing in a first direction along the path rotates the indexing hub to index the first arm out of an article pickup position while indexing an article grasping means on another of the plurality of arms into alignment with the article pickup station. Means actuatable during travel of the carrier housing in a second direction along the path maintains the plurality of arms in their indexed position just achieved, while the carrier housing is traveling in the second direction to move the newly aligned article grasping means on the other arm into article grasping position at the pickup station at the original departure point on the travel path.

The apparatus further includes means for actuating the article grasping means to grasp an article when the article grasping means is at a pickup station. Means responsive to the inversion of an article grasping means from an article pickup position by the indexing hub means causes the article grasping means to release its grasp on an article carried thereby.

The first direction of travel of the carrier housing in the specific embodiment shown is upwardly along the path while the second direction of travel of the carrier housing is downwardly along the vertical linear path.

The apparatus described may further include an article deposit station having spaced article receiving elements located to strip an article from an inverted article grasping means during downward travel of the carrier housing.

A reorienting means may be used to rotate an article grasping means during its travel between the article pickup and deposit stations to orient an article in a new position at the deposit station. The reorienting means may include means for rotatably supporting each article grasping means on its pickup arm, cam arrangement means responsive to indexing rotation of the indexing hub means, and linkage means connecting the cam means and the article grasping means for translating movement of the cam arrangement means into rotational movement for the article grasping means.

In the specific embodiment shown, the reorienting means includes an arcuate cam track positioned around the axis of rotation of the indexing hub, a lever arm pivotally supported a predetermined radial distance from the axis of rotation of the indexing hub, a rotating arm extending from the rotatable grasping means, and connecting link means. The pivotal support of the lever arm is movable with the pickup arm along an arcuate path in response to indexing movement of the hub means. One end of the lever arm carries a cam follower which rides against the arcuate cam track. The other end of the pivotally supported lever arm is connected by the connecting link to the rotating arm extending from the article grasping means.

Each of the article grasping means may comprise a vacuum chuck assembly which includes a vacuum pickup head and means responsive to contact with an article for enabling connection of a vacuum source to the pickup head. If the articles being transferred have a concave surface, then the article grasping means advantageously includes a vacuum chuck assembly which, when located at the pickup station, extends from its pickup arm into and establishes a vacuum grasp on the concave surface of an article at the pickup station. If the articles being transferred are carried on a concave support there is further advantageously included means for enabling operation of the index hub rotating means only after the carrier housing has moved a sufficient distance vertically upwardly to permit indexing hub rotation without any contact with a concave support at the pickup station.

The vacuum chuck apparatus of the article pickup or grasping means may include a hollow piston shaft, a cylinder having a bore for slidably receiving the piston shaft, and a vacuum pickup head carried on a portion of the hollow piston shaft which extends from the cylinder, the pickup head communicating with the hollow interior of the piston shaft.

A first vacuum plenum means is formed in the cylinder adjacent the bore which receives the shaft and means are provided for connecting the first vacuum plenum means to a vacuum source. The piston shaft has a first aperture means formed therein for connecting the hollow interior of the shaft with the first vacuum plenum means. The travel of the piston shaft in the first bore is advantageously limited between a first stop position in which the shaft is slidably extended from the bore, and a second stop position in which the shaft is retracted into the bore. The first shaft aperture means is located in the shaft so that when the shaft is at the first stop position there is no communication between the hollow interior of the shaft and the first vacuum plenum. But when the shaft is slidably moved from the first stop position toward the second stop position in response to contact with an article to be grasped, the first aperture means is moved into alignment with the first vacuum plenum means.

There is advantageously further included means for closing the ends of the first bore in the cylinder and the shaft, opposite the pickup head ends thereof, to define a closed chamber for damping the movement of the shaft. The cylinder also has a second larger bore formed therein. A piston head is carried on the shaft and slidably received in the second larger bore. A second vacuum plenum means is formed in the cylinder adjacent the first bore and means are provided for connecting the second vacuum plenum means to the second larger bore. A second aperture means is formed in the piston shaft for connecting the hollow interior of the shaft with the second vacuum plenum means. The second aperture means is located in the shaft relative to the first mentioned aperture means so that slidable movement of the piston shaft in the first bore will connect the first aperture means to the first vacuum plenum means to enable an article to be grasped by the pickup head before the second aperture means connects the hollow interior of the shaft to the second bore via the second vacuum plenum means. The connection of the second vacuum plenum means to the interior of the shaft reduces the pressure in the second bore and enables a lifting by the piston head of the piston shaft and an article grasped thereby on the ends of the piston shaft by the vacuum established in the second bore.

A needle valve means may be provided between the second vacuum plenum means and the second bore to enable controlling the rate of lift of the article and the pickup head by the piston head in the second bore. Slidable guide means may be provided for preventing rotation of the piston shaft in the first bore to retain the alignment of the first and second aperture means in the shaft with the first and second vacuum plenum means adjacent the first bore.

The combination disclosed herein further includes an article molding machine having a plurality of molds forming articles to be transferred, and means for indexing the molds into and out of the article pickup station. Means responsive to the mold indexing means may be utilized to prevent the carrier housing from moving an article grasping means into the pickup station while the mold indexing means is indexing molds into and out of the pickup station. Means may be also provided which are responsive to the location of an article grasping means within a predetermined distance of the pickup station to inhibit the operation of an article supplying means in indexing an article into the pickup station. An automatic mechanical clutch is disclosed which includes a rotatable input element, an output element to be selectively rotated by the input element, and means for supporting the input and output elements enabling rotation relative to and in alignment with each other. Axially movable connecting means are carried by one of the input and output elements for connecting the input and output elements for rotation together. Means are provided for axially moving the connecting means and include means responsive to rotation of the input element in a first direction for advancing the connecting means into an element connecting position, and responsive to rotation of the input element in a second direction for retracting the connecting means to an element disengagement position.

The input element advantageously has an annular surface having screw threads formed therein. The rotation responsive means advantageously includes a thrust collar having an annular surface with screw threads formed thereon which mate with the input element screw threads. Means are provided for slidably guiding the thrust collar for axial movement. The thrust collar and the input element screw threads thus cooperate to advance the thrust collar on the guide means in response to rotation of the input element in a first direction, and to retract the thrust collar in response to rotation of the input element in a second direction.

The connecting means advantageously comprises a pin means carried by one of the input and output elements. The other of the input and output elements has indexing pin seat means formed therein for receiving the pin means when the pin means is axially moved by the rotation responsive means.

The means for axially moving the connecting means may include a shift collar having radially extending flange means, the shift collar also being slidably mounted on the guide means enabling the shifting of the collar for axial movement. The pin means has a radial slot means formed therein for receiving the radial flange of the shift collar. The cooperating slot-flange arrangement enables rotation of the pin means about an axis of the element carrying the pin means while also enabling the application of advancing and retracting forces to the pin means by the shift collar.

The means for axially moving the connecting means may further include engagement spring means, disengagement spring means, and the thrust collar means. The engagement means is supported to yieldingly urge the shift collar and the shift pin means toward a position of engagement with the indexing pin seat means. The disengagement spring means is supported by the thrust collar to yieldingly urge the shift collar and the pin means toward a position of disengagement from the indexing pin seat means. The thrust collar is responsive to the rotation of the input element for advancing and retracting the support position of the disengagement spring means to change the relative spring forces exerted by the engagement and disengagement spring means on the shift collar.

The connecting pin means is advantageously carried by the output element and the means for supporting the input and output element includes a wall means which is stationary with respect to the input and output elements. The wall means is then advantageously located adjacent to the output element and has locking or stationary pin seat means formed therein for receiving the connecting pin means when the pin means is disengaged from the input element, thereby enabling the output element to be held stationary or locked in a hold position when not being rotated by the input element.

In the specific embodiment shown herein the clutch is responsive to travel of the carrier housing in a first direction for engaging the rotatable drum or hub driving means to rotate the indexing hub means. The clutch means is further responsive to the location of the carrier housing at the start of the first direction of travel for urging the connecting means into engagement between the rotatable drum and the indexing hub. The clutch means is also responsive to the completion of an indexing movement of the indexing hub for urging the connecting means out of engagement between the rotatable drum and the indexing hub and to lock the indexing hub against rotation.

There is further disclosed and described apparatus for controlling the movement of an element along a path which includes means for programming the movement of the element along the path including means for providing an input signal to the element moving means which has information on the desired direction of movement. The actual position of the element along the path is sensed and means are provided for comparing the program movement and the actual position of the element on the path. Means responsive to the comparing means is utilized to prevent starting operation of the element moving means when the difference between a programmed movement and the actual position of the element exceeds a predetermined value.

When the element is to be reciprocated back and forth along a predetermined path there is further provided means for sensing the last direction of movement of the element along the path between the ends of the path, and means responsive to a difference between a programmed direction of movement and the last direction of movement between the ends of the path for interrupting operation of the element moving means.

The input signal may be provided by a second machine which is to be operated in phase with the movement of the element along the path. The comparing means may then provide an out of phase signal in response to a difference in program movement of the element from a first position to a second position along the path when the actual position sensing means indicates that the element is not available to be moved from the first position to the second position.

The input signal providing means may include a program cam arrangement. The actual position sensing means may include a movement feedback cam arrangement. The comparing means then advantageously includes a differential lever means having one end responsive to the program cam arrangement and the other end responsive to the feedback cam arrangement. Power may then be supplied to the element moving means by means which includes a plunger which is responsive to the differential lever to thus control the amount of power required.

There has also been described and disclosed herein a sub-system in the apparatus for transferring an article from a pickup station to a deposit station which includes an indexing hub journally supported for rotation, an article pickup means including at least one arm extending from the indexing hub and an article grasping means carried on the arm and means for indexing the hub and the extended arm to move the article grasping means in an arcuate path from a depending position at the article pickup station to an inverted position at the deposit station. The article grasping means is actuated to grasp an article when the article grasping means is at the pickup station. Means responsive to an inversion of the article grasping means from a depending article pickup position to an inverted position by the indexing hub will cause the article grasping means to release its grasp on the article carried thereby. This sub-system then includes an article deposit station having spaced article receiving elements which are located to strip an article from a downwardly moving inverted article grasping means.

Other sub-systems which are combined into the overall novel system have not been separately described in this summary of the description of the preferred embodiments, but have been noted in the foregoing description of the figures. As noted hereinbefore, while the sub-systems are particularly advantageously combined into the overall system, the sub-systems do have application in arrangements other than those specifically shown and described herein.

Accordingly, it is pointed out that while the illustrated examples constitute practical embodiments of my invention, I do not limit myself to the exact details shown or the application of the operation of the structures herein to a particular device since modification of the details of the interrelated components and the overall system, and of the application of the structures in the system, may be made without departing from the spirit and scope of this invention.

I claim:

1. Apparatus for controlling relative motion of a plurality of components, comprising
   a. an element to be selectively rotated;
   b. carrier means for journally supporting said element;
   c. means for moving said carrier means to cause said element to travel along a predetermined linear path, said path having a first portion along which said element is not to be rotated and a second portion along which said element is to be rotated;
   d. means for rotating said element;
   e. means for sensing the position of said element on said linear path and providing a signal when said element is on one of said portions;
   f. means responsive to said sensing means signal for connecting said element rotating means to rotate said element when said element is traveling along said second portion of said path;
   g. an indexing hub means journally supported in said carrier means;
   h. clutch means for selectively connecting said indexing hub means to said element to be selectively rotated;
   i. means for actuating said clutch means to selectively connect said indexing hub means to said element to be selectively rotated when said element is traveling in a first direction along said linear path;
   j. said element rotating means being connected through said rotatable element to rotate said indexing hub means a predetermined angular amount;
   k. means for maintaining said indexing hub means at its angularly rotated position when said element is traveling in a second direction along said linear path;
   l. at least one arm extending from said indexing hub means;
   m. article grasping means carried on said arm;
   n. means for successively supply articles to an article pickup station to be grasped by said article grasping means; and
   o. means for synchronizing said article supplying means and the movement of said carrier means to enable the disposition of said article grasping means at said article pickup station when an article has been supplied at said station by said article supplying means.

2. Apparatus as defined in claim 1 which further includes
   a. means for sensing an article supplying movement of said article supplying means to said pickup station; and
   b. means responsive to said article supplying movement sensing means for enabling movement of said article grasping means to grasp an article at said pickup station only when said article supplying means is in a position to avoid contact between said article supplying and said article grasping means.

3. Apparatus as defined in claim 1 in which said synchronizing means includes means for enabling a cyclic movement of said carrier means in response to a corresponding cyclic movement of said article supplying means.

4. Apparatus as defined in claim 1 which further includes
   a. means for programming a cyclic movement of said carrier means in response to a corresponding cyclic movement of said article supporting means;
   b. means for sensing actual position of said carrier means; and
   c. means for comparing said sensed actual position of said carrier means and said programmed cyclic movement for said carrier means and interrupting movement of said carrier means if said actual position of and said programmed movement for said carrier means are out of phase a predetermined amount.

5. Apparatus as defined in claim 1 which further includes
   a. means for sensing the position of said article grasping means with respect to said article supplying means; and
   b. means for inhibiting an article supplying movement of said article supplying means in response to the sensing of a position of said article grasping means which would interfere with movement of said article supplying means.

6. Apparatus for transferring an article from an article pickup station to an article deposit station, comprising
   a. a carrier housing;
   b. means for moving said carrier housing up and down along a vertical travel path;
   c. indexing hub means journally supported for rotation in said carrier housing;
   d. article pickup means including a plurality of arms extending from said hub means and an article grasping means carried on each of said arms, a first one of said arms extending toward and positioning the article grasping means carried thereon at a pickup station to enable article grasping when said carrier housing is at one end of said travel path;
   e. means responsive to travel of said carrier housing in a first direction along said path for rotating said hub means to index said first arm out of an article pickup position while indexing an article grasping means on another of said plurality of arms into alignment with said article pickup station;
   f. means actuatable during travel of said carrier housing in a second direction along said path for maintaining said plurality of arms in their indexed position achieved during travel of said carrier housing in said first direction to move said aligned article grasping means on said other arm into article grasping position at said pickup station at said one end of said travel path;

g. means for indexing articles into said pickup station; and h. means responsive to said article indexing means for preventing said carrier housing means from moving an article grasping means into said pickup station while an article is being indexed into said pickup station.

7. Apparatus for transferring an article from an article pickup station to an article deposit station, comprising a. a carrier housing;

b. means for moving said carrier housing up and down along a vertical travel path;

c. indexing hub means journally supported for rotation in said carrier housing;

d. article pickup means including a plurality of arms extending from said hub means and an article grasping means carried on each of said arms, a first one of said arms extending toward and positioning the article grasping means carried thereon at a pickup station to enable article grasping when said carrier housing is at one end of said travel path;

e. means responsive to travel of said carrier housing in a first direction along said path for rotating said hub means to index said first arm out of an article pickup position while indexing an article grasping means on another of said plurality of arms into alignment with said article pickup station;

f. means actuatable during travel of said carrier housing in a second direction along said path for maintaining said plurality of arms in their indexed position achieved during travel of said carrier housing in said second direction to move said aligned article grasping means on said other arm into article grasping position at said pickup station at said one end of said travel path;

g. an article molding machine having a plurality of molds for forming articles to be transferred;

h. means for indexing said molds into and out of said article pickup station; and i. means responsive to said mold indexing means for preventing said carrier housing means from moving an article grasping means into said pickup station while said mold indexing means is indexing molds into and out of said pickup station.

8. Apparatus as defined in claim 7 which further includes means responsive to the position of an article grasping means within a predetermined distance of said pickup station for inhibiting operation of said mold indexing means.

9. Apparatus for transferring an article from an article pickup station to an article deposit station, comprising a. a carrier housing;

b. means for moving said carrier housing up and down along a vertical travel path;

c. indexing hub means journally supported for rotation in said carrier housing;

d. article pickup means including a plurality of arms extending from said hub means and an article grasping means carried on each of said arms, a first one of said arms extending toward and positioning the article grasping means carried thereon at a pickup station to enable article grasping when said carrier housing is at one end of said travel path;

e. means responsive to travel of said carrier housing in a first direction along said path for rotating said hub means to index said first arm out of an article pickup position while indexing an article grasping means on another of said plurality of arms into alignment with said article pickup station;

f. means actuatable during travel of said carrier housing in a second direction along said path for maintaining said plurality of arms in their indexed position achieved during travel of said carrier housing in said second direction to move said aligned article grasping means on said other arm into article grasping position at said pickup station at said one end of said travel path;

g. means for indexing articles into said pickup station; and h. means responsive to the location of an article grasping means within a predetermined distance of said pickup station for inhibiting operation of said article indexing means.

* * * * *

UNITED STATES PATENT OFFICE
CERTIFICATE OF CORRECTION

PATENT NO. : 3,895,925
DATED : July 29, 1975
INVENTOR(S) : Mario Cuniberti

It is certified that error appears in the above–identified patent and that said Letters Patent are hereby corrected as shown below:

Col. 6, line 47, "fromt" should be --front--;
    line 53, "will" should be deleted; after "is" insert --shown as--.

Col. 14, line 34, "force" should be --forces--.

Col. 24, line 26, "vlave" should be --valve--.

Col. 28, line 52, "cros-sec-" should be --cross-sec- --.

Col. 33, line 35, "cotory" should be --rotary--.

Col. 41, line 52 (Claim 1.n.), "supply" should be --supplying--.

Signed and Sealed this twenty-third Day of December 1975

[SEAL]

Attest:

RUTH C. MASON
Attesting Officer

C. MARSHALL DANN
Commissioner of Patents and Trademarks